US012142958B2

United States Patent
Yoshikawa

(10) Patent No.: US 12,142,958 B2
(45) Date of Patent: Nov. 12, 2024

(54) CHARGE AND DISCHARGE CONTROL CIRCUIT FOR CONTROLLING CHARGE AND DISCHARGE OF SECONDARY BATTERY CONNECTED BETWEEN POSITIVE AND NEGATIVE ELECTRODE POWER SUPPLY TERMINALS

(71) Applicant: Nisshinbo Micro Devices Inc., Tokyo (JP)

(72) Inventor: Takayasu Yoshikawa, Itami (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 504 days.

(21) Appl. No.: 17/596,334

(22) PCT Filed: Jan. 19, 2021

(86) PCT No.: PCT/JP2021/001725
§ 371 (c)(1),
(2) Date: Dec. 8, 2021

(87) PCT Pub. No.: WO2022/157836
PCT Pub. Date: Jul. 28, 2022

(65) Prior Publication Data
US 2022/0231529 A1 Jul. 21, 2022

(51) Int. Cl.
*H02J 7/00* (2006.01)
*H01M 10/44* (2006.01)
*H01M 10/46* (2006.01)

(52) U.S. Cl.
CPC ....... *H02J 7/007182* (2020.01); *H01M 10/44* (2013.01); *H01M 10/46* (2013.01);
(Continued)

(58) Field of Classification Search
CPC ............ H02J 7/007182; H02J 7/00306; H02J 7/0031; H02J 7/0032; H02J 7/0036;
(Continued)

(56) References Cited

U.S. PATENT DOCUMENTS

2010/0129700 A1* 5/2010 Tanno ................. H01M 10/441
429/93
2019/0115771 A1* 4/2019 Abe .................... H02J 7/00306
(Continued)

FOREIGN PATENT DOCUMENTS

JP 10285810 A * 10/1998
JP 2010-124640 6/2010
(Continued)

OTHER PUBLICATIONS

English translation of the International Preliminary Report on Patentability (IPRP), in connection with PCT/JP2021/001725.
(Continued)

*Primary Examiner* — Richard Isla
*Assistant Examiner* — Manuel Hernandez
(74) *Attorney, Agent, or Firm* — Paul Teng

(57) ABSTRACT

A charge and discharge control circuit controls charge and discharge of a secondary battery connected between a positive electrode power supply terminal and a negative electrode power supply terminal by using a discharge control switching element and a charge control switching element connected between the secondary battery and a load or a charger and includes a charger connection detector circuit that generates a charger connection detection signal, based on a voltage of an external negative electrode terminal connected to the charger; and a pull-up detector circuit that detects a pull-up of the voltage of the external negative electrode terminal, based on the voltage of the external negative electrode terminal, and generates a pull-up detec-
(Continued)

tion signal. The charge and discharge control circuit turns off the discharge control switching element, and then, turns on the same after receiving the pull-up detection signal and the charger connection detection signal.

10 Claims, 14 Drawing Sheets

(52) U.S. Cl.
CPC ........ *H02J 7/00306* (2020.01); *H02J 7/0031* (2013.01); *H02J 7/0032* (2013.01); *H02J 7/0036* (2013.01); *H02J 7/0063* (2013.01); *H02J 7/0068* (2013.01)

(58) Field of Classification Search
CPC ...... H02J 7/0063; H02J 7/0068; H01M 10/44; H01M 10/46
USPC ................................ 320/128, 134, 135, 136
See application file for complete search history.

(56) References Cited

U.S. PATENT DOCUMENTS

| | | | |
|---|---|---|---|
| 2019/0181660 A1* | 6/2019 | Shibata | H01M 10/4257 |
| 2022/0045533 A1* | 2/2022 | Hoshino | H02J 7/0047 |
| 2023/0291018 A1* | 9/2023 | Hoshino | H01M 10/46 |

FOREIGN PATENT DOCUMENTS

| | | |
|---|---|---|
| JP | 2019-75861 | 5/2019 |
| JP | 2019-106748 | 5/2019 |

OTHER PUBLICATIONS

Jan. 21, 2020 e-mail from Yuki Kashima to Andrea Tortoriello and 17 others [and English translation of the Jan. 21, 2020 e-mail].
Attachment to Jan. 21, 2020 e-mail (AW): "[RICOH]R5448Z_Specificationn Change Notification.pdf".
Attachment B to Jan. 21, 2020 e-mail (AW): "[E]R5448Z501AHE2-F_Preliminary(Jan. 20, 2020.pdf".

* cited by examiner

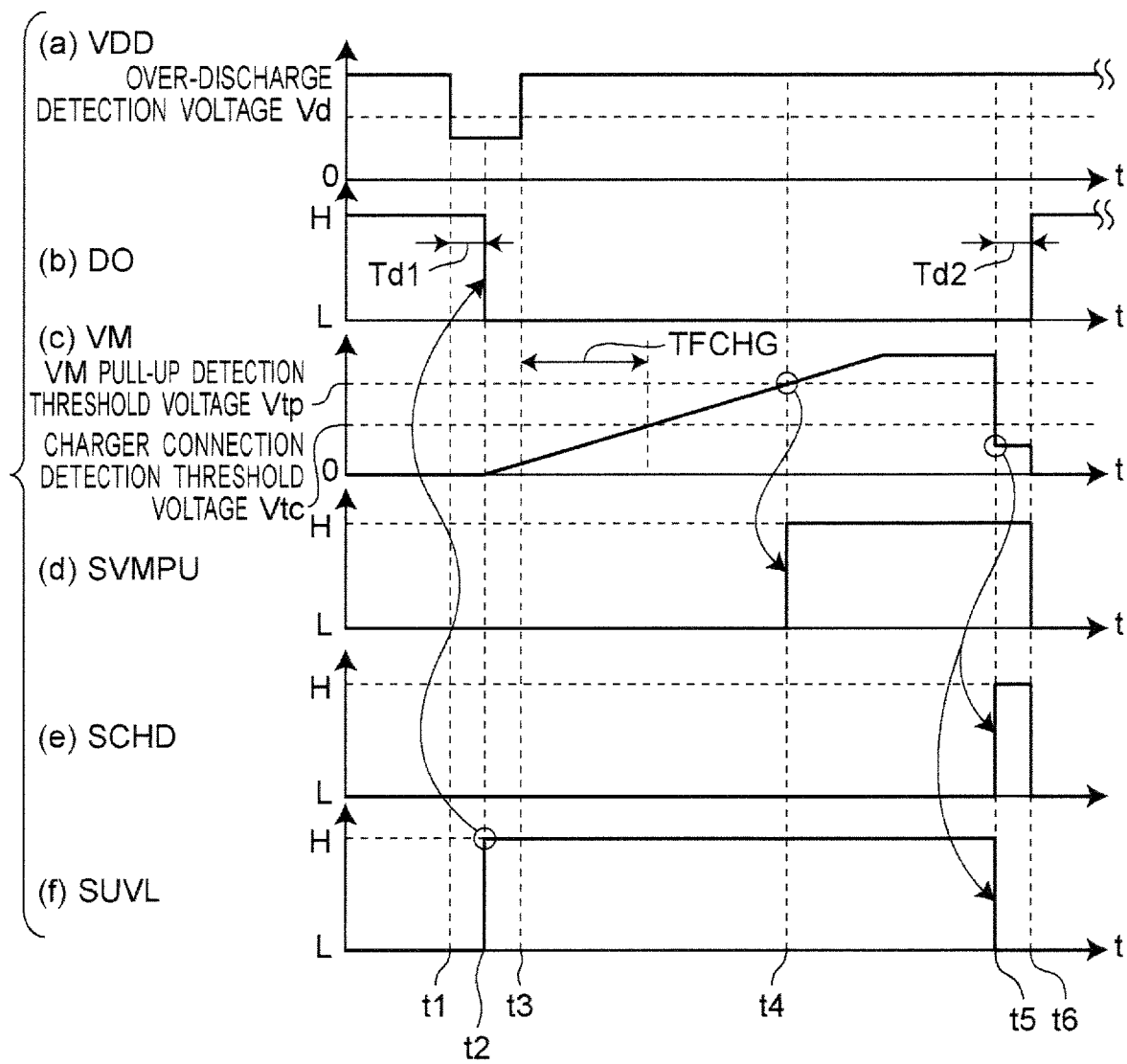

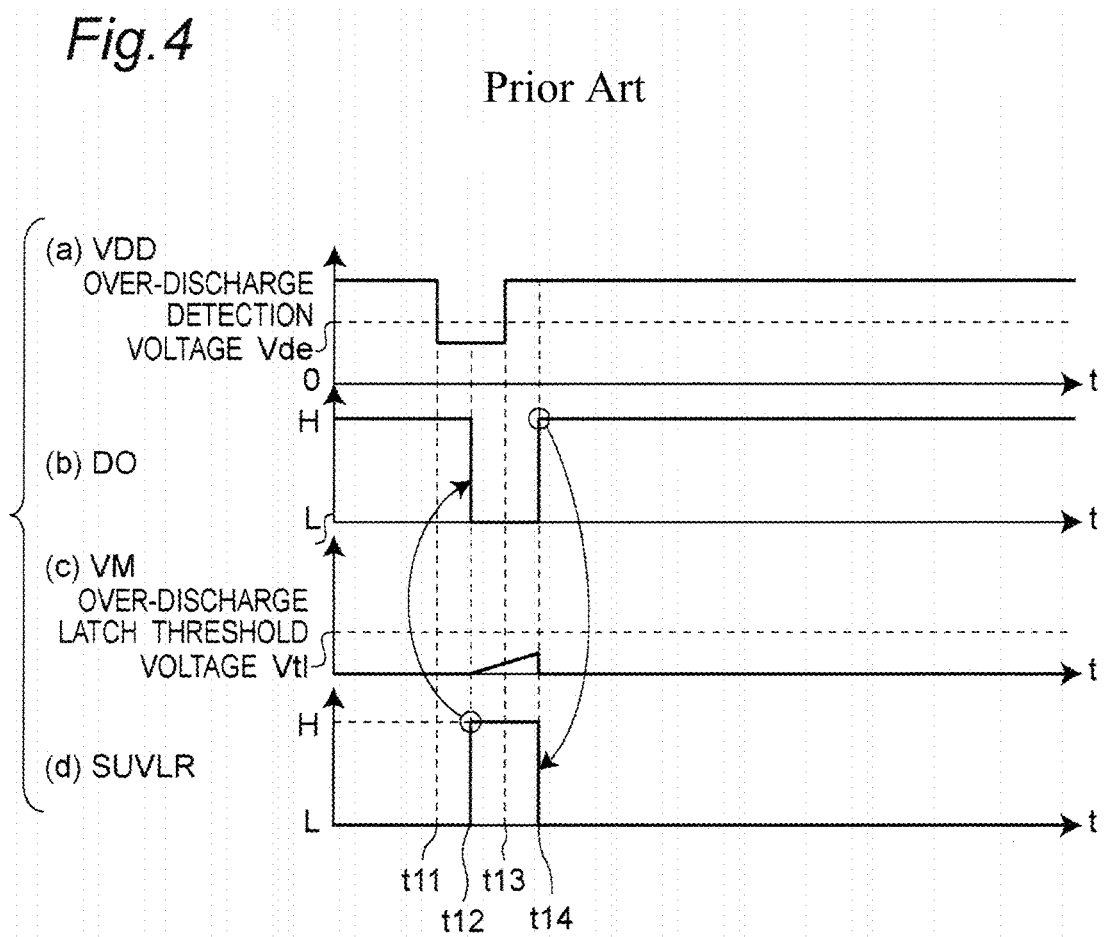

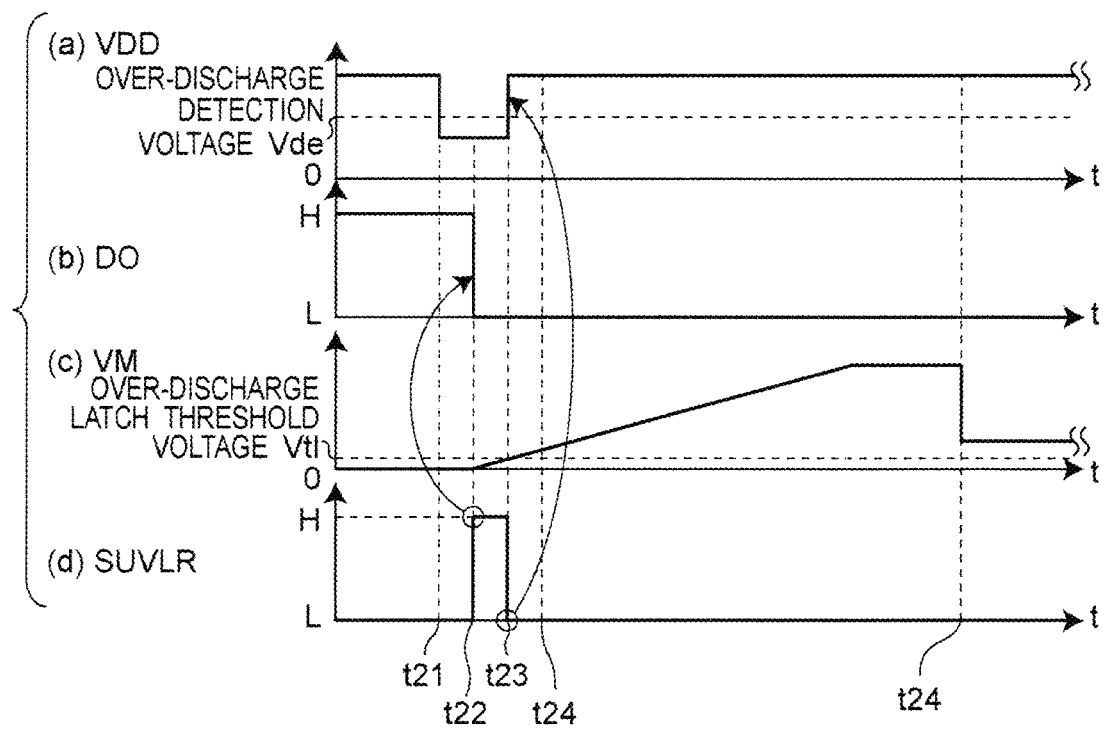

CHARGE AND DISCHARGE CONTROL CIRCUIT FOR CONTROLLING CHARGE AND DISCHARGE OF SECONDARY BATTERY CONNECTED BETWEEN POSITIVE AND NEGATIVE ELECTRODE POWER SUPPLY TERMINALS

TECHNICAL FIELD

The present invention relates to a charge and discharge control circuit and a charge, and discharge control method that control charge and discharge of a battery such as a secondary battery, for example, and to a battery device.

BACKGROUND ART

In general, a battery device of secondary battery is configured to include a secondary battery, a charge and discharge control circuit called a so-called protection circuit, and an external positive electrode terminal and an external negative electrode terminal that are used for charge and discharge of the secondary battery. The charge and discharge control circuit is configured to include a charge and discharge control field-effect transistor (hereinafter, referred to as a charge and discharge control FET) for controlling charge and discharge of the secondary battery, and a charge and discharge control circuit for monitoring the status of the secondary battery to output the signal for switching ON and OFF of the charge and discharge control FET. A load and a charger connected to an external terminal of the battery device are connected via the charge and discharge control circuit to the secondary battery.

The charge and discharge control circuit acts based on a negative electrode power supply voltage VSS of a negative electrode power supply terminal connected to a negative electrode of the secondary battery, and has a function of monitoring a positive electrode power supply voltage VDD of a positive electrode power supply terminal connected to a positive electrode of the secondary battery, and detecting over-charge and over-discharge of the secondary battery. When detecting an over-charge, the charge and discharge control circuit switches a charge control signal from a high level to a low level to turn off the charge control field-effect transistor (hereinafter, referred to as a charge control FET), and this leads to prohibition against charge from the charger to the secondary battery. On the other hand, when detecting an over-discharge, the charge and discharge control circuit switches the discharge control signal from the high level to the low level to turn off a discharge control field-effect transistor (hereinafter, referred to as a discharge control FET), and this leads to prohibition against charge from the secondary battery to the load.

Furthermore, the charge and discharge control circuit is configured such that the same control circuit can detect that the load or the charger has been connected to the battery device by monitoring a voltage (hereinafter, referred to as an external negative electrode input voltage) VM of an external negative electrode input terminal connected to the external negative electrode terminal, and such that detection of the charger connection is included in the conditions for restoration from the over-discharge detection status.

The above charge and discharge prohibition control function implemented by the charge and discharge control circuit may be used not only to protect the secondary battery from the over-charge or the over-discharge, but also to forcibly put the discharge control FET in OFF-state, before shipment of equipment with a load component assembled between the external positive electrode terminal and the external negative electrode terminal of the battery device, for example, for the purpose of preventing such equipment from continuing discharge to the load in transit and continuing to consume the remaining battery amount, and this leads to reduction in the battery consumption. This status is referred to as "forced stand-by status". The "forced stand-by status" may be referred to also as "forced power down", "forced sleep", "shipping mode", "low-consumption mode", etc.

It has already been known that the battery device shipped in the forced stand-by status is configured to restore from the forced stand-by status when a charger is connected, enabling discharge from the secondary battery to a load to allow the equipment to be used.

PRIOR ART DOCUMENT

Patent Document

Patent Document 1: Japanese patent laid-open publication No. JP2019-75861A

SUMMARY OF THE INVENTION

Problems to be Solved by the Invention

However, the conventional charge and discharge control circuit has involved the following two problems including Problems 1 and 2 in using the forced stand-by status.

Problem 1

If the charger connection detection voltage of the external negative electrode voltage input terminal is set to be higher than a predetermined value so that, even when a charger with a voltage somewhat lower than the battery voltage has been connected, the charger connection can be detected, the charger connection is erroneously detected immediately after having entered the forced stand-by status, resulting in unintentional restoration.

Problem 2

If the charger connection detection voltage of the external negative electrode voltage input terminal is set to be lower than the predetermined value so as not to erroneously detect the charger connection immediately after having entered the forced stand-by status, the charge and discharge control circuit cannot detect the charger connection of the charger with a voltage somewhat lower than the battery voltage, and restoration from the forced stand-by status cannot be done.

An object of the present invention is to solve the above problems to provide a charge and discharge control circuit, a charge and discharge control method, and a battery device including the charge and discharge control circuit, where even when connecting a charger with a voltage lower than a predetermined value with the discharge control FET being turned off by the charge and discharge control circuit of the battery device, the circuit and the method can reliably detect a connection of the charger.

Means for Solving Problems

According to one aspect of the invention, there is provided a charge and discharge control circuit configured to control charge and discharge of a secondary battery connected between a positive electrode power supply terminal and a negative electrode power supply terminal by using a discharge control switching element and a charge control switching element connected between the secondary battery and a load or a charger. The charge and discharge control circuit includes a charger connection detector circuit, and a pull-up detector circuit. The charger connection detector circuit generates a charger connection detection signal, based on a voltage of an external negative electrode terminal connected to the charger, and the pull-up detector circuit detects a pull-up of the voltage of the external negative electrode terminal, based on the voltage of the external negative electrode terminal, and generates a pull-up detection signal. The charge and discharge control circuit is configured to turn off the discharge control switching element, and then, turn on the discharge control switching element after receiving the pull-up detection signal and receiving the charger connection detection signal.

Effects of the Invention

Thus, according to the charge and discharge control circuit of the present invention, even when connecting the charger with the voltage lower than the predetermined value with the discharge control FET being turned off by the charge and discharge control circuit of the battery device, it is possible to identify the connection of the charger safely and reliably.

BRIEF DESCRIPTION OF DRAWINGS

FIG. 3 is a timing chart of voltages showing actions of the battery device 10 of FIG. 1.

FIG. 4 is a timing chart of voltages for explaining Problem 1 that an over-discharge latch is released and restored unintentionally from an over-discharge detection status in a battery device of the prior art.

FIG. 5 is a timing chart of the voltages for explaining Problem 2 that the return from the over-discharge detection status to the over-discharge latch release is impossible in the battery device of the prior art.

MODES FOR CARRYING OUT THE INVENTION

Figure 1:
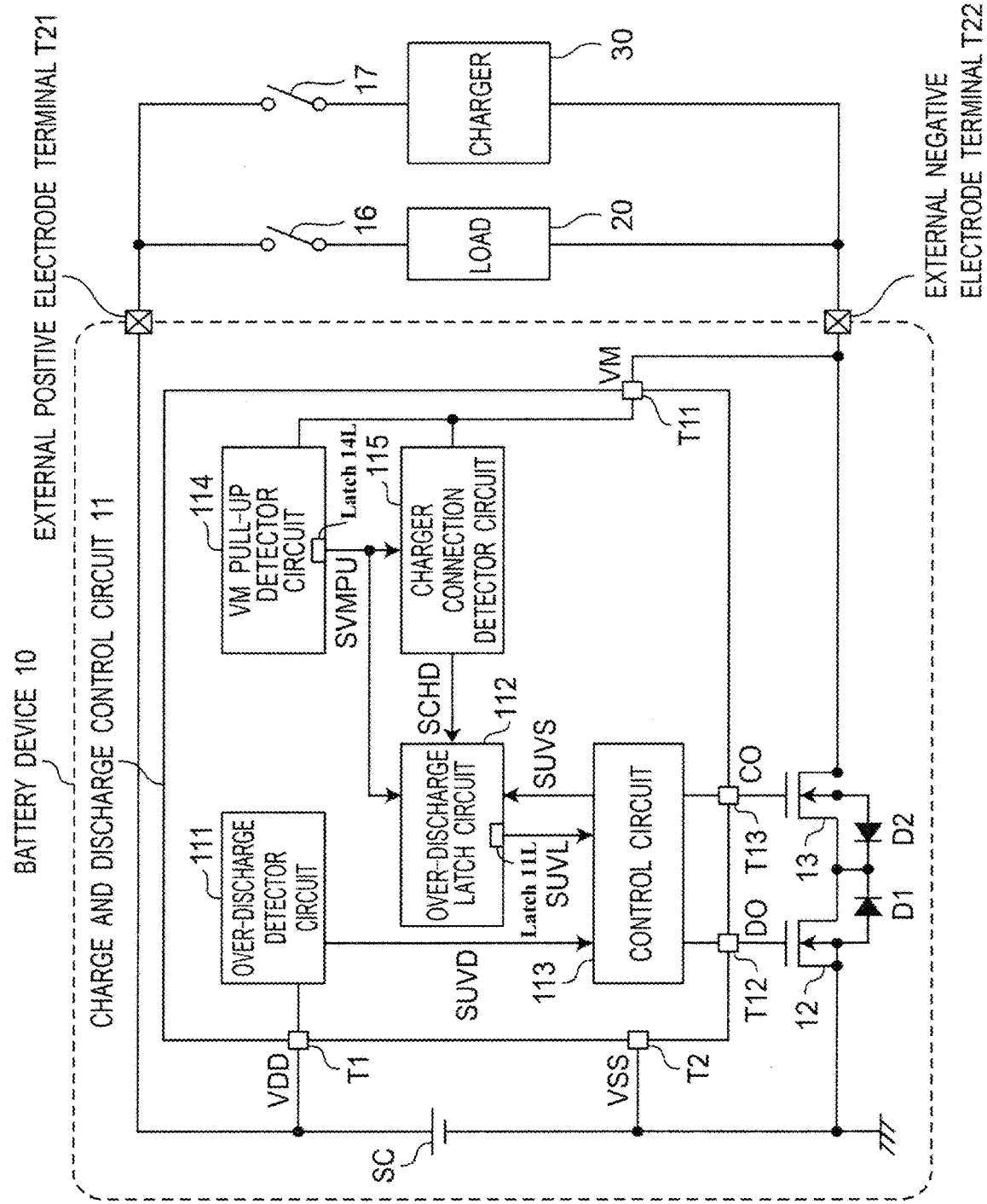
FIG. 1 is a block diagram showing a configuration example of a battery device 10 according to a first embodiment.

Embodiments and modified embodiments according to the present invention will hereinafter be described with reference to the drawings. The same reference numerals are imparted to the same or like constituent elements Findings of Inventor As set forth in the section of "PROBLEMS TO BE SOLVED BY THE INVENTION", it has been described that there are two problems in using the conventional forced stand-by status.

In Patent Document 1, Problem 1 of erroneous restoration occurring with a high charger connection detection threshold value is taken up as an issue to be solved. It is disclosed herein as an issue to "need to wait for a long time" until an external negative electrode input voltage VM is pulled up so as not to bring about an erroneous restoration from the forced stand-by status. Specifically, the external negative electrode input voltage VM is gradually pulled up to the potential of the external positive electrode terminal when the charge and discharge control circuit turns off the discharge control FET in the status where a load is connected to the battery device with no charger connected thereto. However, in the case that the connected load has a relatively large capacitance, pulling up the external negative electrode voltage input terminal takes time and may require several seconds.

If the charger connection detection threshold value is higher than a predetermined value in the case that it takes time for the voltage rise by pull-up of the external negative electrode voltage input terminal in this manner, "charger connection erroneous detection time interval" become longer during which the charge and discharge control circuit makes erroneous determination that the charger is in connection even though the charger is not actually connected, when the external negative electrode input voltage VM is lower than the charger connection detection threshold value at the initial stage of pulling up. As a result, immediately after the discharge control FET is forcibly turned off into forced stand-by status through external control of the charge and discharge control circuit, the charge and discharge control circuit erroneously detects the charger connection, allowing unintentional restoration from the forced stand-by status.

In order to avoid this erroneous restoration, it is necessary to continue to keep the externally controlled status of the charge and discharge control circuit until the external negative electrode voltage input terminal is pulled up to the charger connection detection voltage or more. Since the time to keep that status becomes longer depending on the "charger connection erroneous detection time", leading to increase in the pre-shipping process time, and increase in the cost attendant thereon.

For the purpose of solving this issue, Patent Document 1 discloses such an idea that the over-discharge detection status is latched when the external negative electrode input voltage VM exceeds a predetermined set voltage. This is certainly similar to those of the embodiments of the present invention in that the external negative electrode input voltage VM is used as the condition in order to prevent the erroneous restoration occurring immediately after the over-discharge detection. However, the issue of Problem 2 described above has not been solved that restoration from the forced stand-by status becomes infeasible when connecting a charger with a voltage somewhat lower the battery voltage.

Thus, in the charge and discharge control circuit according to a first embodiment of the present invention, the over-discharge prohibition detection status is first latched irrespective of the external negative electrode input voltage VM immediately after the condition for shifting to the discharge prohibition status has been established, and thereafter the pull-up status is latched when the pull-up detector circuit detects that the external negative electrode voltage input terminal voltage is pulled up by a load and has once exceeded a predetermined voltage. The charge and discharge control circuit disables the charger connection detection function until the pull-up status is latched. This prevents the charge and discharge control circuit from making erroneous determination of the charger connection when below the predetermined voltage even if the pull-up of the external negative electrode voltage input terminal has proceeded slowly. It is therefore possible to set the charger connection detection threshold value to a voltage higher than a predetermined value. The setting of the charger connection detection threshold value to a voltage higher than the predetermined value ensures correct connection determination even when the battery has a voltage somewhat lower than the battery voltage.

The summary of the above first embodiment according to the present invention is as follows.

In order to release the latch of the discharge prohibition status to turn on the discharge control FET, Condition B needs to be met after having met Condition A which follows.

(the external negative electrode input voltage $VM$)>
(the $VM$ pull-up detection threshold value $Vtp$)
(for example, $Vtp=3V$)     Condition A:

(the external negative electrode input voltage $VM$)<
(the charger connection detection threshold
value $Vtc$) (for example, $Vtc=2V$)     Condition B:

With $Vtc \leq Vtp$, let the positive electrode power supply voltage VDD be 4 V, then, for example, 3 V of the VM pull-up detection threshold value Vtp may be defined as a value obtained by subtracting 1 V from the positive electrode power supply voltage VDD. However, if only the above idea is incorporated into the charge and discharge control circuit, the other Problem 3 may possibly arise. A charge start detection threshold voltage Vts related to Condition C of a second embodiment for solving this Problem 3 will be described hereinbelow.

Before the external negative electrode input voltage VM satisfies Condition A after the charge and discharge control circuit has turned off the discharge control FET, a charger may possibly be connected to the external positive electrode terminal and the external negative electrode terminal, or the charge and discharge control circuit may possibly turn off the discharge control FET with the charger already connected.

When the charger is in connection, the external negative electrode input terminal is not pulled up, but if the positive electrode power supply voltage VDD is 4 V and the charger voltage is 5V, then the external negative electrode input voltage VM is fixed to −1 V, namely, to the status not meeting Condition A, leaving the charger connection detection function disabled. In this case, there arises such an issue that the charge and discharge control circuit does not detect the charger connection even if the charger voltage is larger than a voltage (VDD−Vtc). Additionally, there also arises another issue that at this time, charge is performed via the parasitic diode of the charge control FET, with the discharge control FET being turned off. For example, when charge current is caused to flow via the parasitic diode, heat loss is significantly large compared with when the charge control FET is in ON-state. For example, flowing of the current via the parasitic diode over a long time such as several minutes to one hour will lead to increased cost of the battery device if nothing is done, since charge control FETs capable of withstanding heat loss are expensive.

In order to solve this Problem 3, in the second embodiment according to the present invention, if the charge and discharge control circuit has detected the relationship of (the charger voltage)>(the battery voltage), based on the external negative electrode input voltage VM, the charge and discharge control circuit ignores Condition A to allow the discharge control FET to return to ON-state in a short time. In order to implement this detection method, a phenomenon is utilized that when charger voltage>battery voltage is achieved to allow charge current to flow via the parasitic diode with the discharge control FET being turned off, namely, when charging is started, the external negative electrode terminal voltage of the battery device becomes lower by a forward voltage Vf of the parasitic diode than the negative electrode voltage of the secondary battery.

The summary of this second embodiment is as follows.

Condition C is set in addition to the above Conditions A and B so that when charge current is detected and charging is started, it is determined that the charger has been connected even though Condition A is not met, to release the latch of the discharge prohibition status.

(the external negative electrode input voltage $VM$)<
(the charge start detection threshold voltage
$Vts$) (for example, $Vts=0$ V or $-0.5$ V)     Condition C:

By configuring the charge and discharge control circuit having the above Conditions A and B or Conditions A, B, and C together, the following effects according to the first and second embodiments of the present invention can be obtained.

According to the first embodiment of the present invention, erroneous restoration is prevented even in the case that it takes time to raise voltage of the external negative electrode voltage input terminal by pulling up. Furthermore, since the charger connection can correctly be determined even in the case of a charger having a low voltage, the discharge control FET can reliably be turned on when the charger is connected. The pre-shipping process time can thus be reduced. Additionally, in equipment mounted with the battery device, in the case that the discharge control FET has been turned off due to shipping in the forced stand-by mode or due to the over-discharge status or the discharge overcurrent detection status in use, reliable and safe equipment use can thereafter be started by connecting the charger when wanted to use the equipment.

Accordingly, in the charge and discharge control circuit protecting the secondary battery from over-charge, over-discharge, etc., the charger connection detector circuit is disabled until the charge and discharge control circuit detects that the external negative electrode input voltage VM has been pulled up once beyond a predetermined voltage in the discharge prohibition status latched immediately after the charge and discharge control has switched the discharge control signal from the high level to the low level to prohibit discharge. In consequence, the charge and discharge control circuit is prevented from erroneously determining the charger connection even though pull-up of the external negative electrode input voltage VM has proceeded slowly, so that the charger connection detection threshold value can be set to a voltage higher than the predetermined value without worrying about the erroneous restoration from the forced standby status caused by the erroneous determination of the charger connection. It is also possible in the case of connection of a charger having a voltage lower than the predetermined value to detect the connection reliably, allowing restoration of the charge and discharge control circuit from the discharge prohibition status.

According to the second embodiment, the above issues can be solved that occur when assuming special situations such as the status where a charger has already been connected or the case where the charger is connected immediately after the discharge control FET has been turned off.

First Embodiment

FIG. 1 is a block diagram showing a configuration example of a battery device 10 according to the first embodiment.

Referring to FIG. 1, the battery device 10 is configured to include a secondary battery SC, a charge and discharge control circuit 11, a discharge control field-effect transistor (FET) 12, a charge control FET 13, and an external positive electrode terminal T21 and an external negative electrode terminal T22 to which a load 20 or a charger 30 is connected. The discharge control FET 12 and the charge control FET 13 are each an example of a switching element which may be another switching element such as a bipolar transistor such as an insulated gate bipolar transistor (IGBT), for example.

Although the charger 30 or the load 20 is physically attached or detached or is electrically conducted or cut off by using a switch, this is achieved by using switches 16 and 17 of FIG. 1. The external positive electrode terminal T21 is connected to the external negative electrode terminal T22 via the switch 16 and the load 20 or via the switch 17 and the charger 30. There is a resistive load or a capacitive load as the load 20. The resistive load refers to equipment driven by a battery, such as a central processing unit (CPU) or a motor, while the capacitive load refers to a capacitor capacitance or to a total capacitance of all parasitic capacitances etc. such as wirings.

The charge and discharge control circuit 11 is configured to include an over-discharge detector circuit 111, an over-discharge latch circuit 112, a control circuit 113, a VM pull-up detector circuit 114, a charger connection detector circuit 115, a positive electrode power supply terminal T1 and a negative electrode power supply terminal T2, a discharge control terminal T12, a charge control terminal T13, and an external negative electrode voltage input terminal T11.

The discharge control FET 12 has a source connected to a negative electrode of the secondary battery SC and grounded, a drain connected to a drain of the charge control FET 13, and a gate connected via the discharge control terminal T12 to the control circuit 113, for receiving a discharge control signal DO outputted from the control circuit 113. The charge control FET 13 has a source connected to the external negative electrode terminal T11 and a gate connected via the charge control terminal T13 to the control circuit 113, for receiving a charge control signal CO outputted from the control circuit 113. The discharge control FET 12 and the charge control FET 13 have parasitic diodes D1 and D2, respectively. The discharge control FET 12 is controlled on and off by the discharge control signal DO inputted from the control circuit 113 to the gate, while the discharge control FET 12 is controlled on and off by the charge control signal CO inputted from the control circuit 113 to the gate thereof.

The positive electrode power supply terminal T1 is connected to a positive electrode of the secondary battery SC and to the external positive electrode terminal T21, while the negative electrode power supply terminal T2 is connected to the negative electrode of the secondary battery SC, with the external negative electrode voltage input terminal T11 being connected to the external negative electrode terminal T22. The over-discharge detector circuit 111 compares the positive electrode power supply voltage VDD of the positive electrode power supply terminal T1 with an over-discharge detection voltage Vde, resulting in detecting an over discharge of the secondary battery SC, and then, when VDD≤Vde, generates an over-discharge detection signal SUVD having the high level, and outputs the same signal SUVD to the over-discharge latch circuit 112 and to the control circuit 113. On the other hand, when VDD>Vde, the over-discharge detector circuit 111 generates the over-discharge detection signal SUVD having the low level. Although the voltage of the negative electrode power supply terminal T2 is inputted to the circuits of the charge and discharge control circuit 11, this is not shown in the block diagrams of FIG. 1 and subsequent figures. Although the voltage of the external negative electrode voltage input terminal T11 is inputted as the reference voltage of the charge control signal CO having the low level to the control circuit 113, this is not shown in the block diagrams of FIG. 1 and subsequent figures.

When permitting discharge of the secondary battery SC due to the input over-discharge detection signal SUVD and the input over-discharge latch signal SUVL being both the low level, the control circuit 113 outputs the discharge control signal DO having the high level via the discharge control terminal T12 to the gate of the discharge control FET 12. On the other hand, when prohibiting discharge of the secondary battery SC due to at least one of an over-discharge detection status signal SUVS and the over-discharge latch signal SUVL being the high level after the elapse of a predetermined delay time after input of the over-discharge detection signal SUVD, the control circuit 113 outputs the discharge control signal DO having the low level via the discharge control terminal T12 to the gate of the discharge control FET 12. In the timing chart subsequent to FIG. 2A, the high level of each of the signals is indicated by "H" and the low level of each of the signals is indicated by "L".

When permitting charge of the secondary battery SC, the control circuit 113 outputs the charge control signal CO having the high level via the charge control terminal T13 to the gate of the charge control FET 13, and this leads to turning on the charge control FET 13. On the other hand, when prohibiting charge of the secondary battery SC, the control circuit 113 outputs the charge control signal CO having the low level via the charge control terminal T13 to the gate of the charge control FET 13, and this leads to turning off the charge control FET 13. Normally, the control circuit 113 outputs the discharge control signal DO having the high level via the discharge control terminal T12 to the gate of the discharge control FET 12, to turn on the discharge control FET 12. Subsequently, after a predetermined delay time Td1 has passed after reception of the over-discharge detection signal SUVD having the high level, the control circuit 113 outputs the over-discharge detection status signal SUVS having the high level to the over-discharge latch circuit 112, and outputs the discharge control signal DO having the low level via the discharge control terminal T12 to the gate of the discharge control FET 12, to prohibit discharge from the secondary battery SC.

The VM pull-up detector circuit 114 compares the external negative electrode input voltage VM of the external negative electrode voltage input terminal T11 with a VM pull-up detection threshold voltage Vtp. When detecting that the external negative electrode input voltage VM has been pulled up to the VM pull-up detection threshold voltage Vtp, the VM pull-up detector circuit 114 outputs a VM pull-up detection signal SVMPU from a latch 14L thereof to the charger connection detector circuit 115. The VM pull-up detection threshold voltage Vtp is a voltage defined by the positive electrode power supply voltage VDD−1.2 V, for example. When the positive electrode power supply voltage VDD of the positive electrode power supply terminal T1 is 4.4 V, the VM pull-up detection threshold voltage Vtp is 3.2 V.

The charger connection detector circuit 115 compares the voltage VM of the external negative electrode voltage input terminal T11 with a charger connection detection threshold voltage Vtc. When detecting that the external negative electrode input voltage VM has been pulled down to a voltage lower than the charger connection detection threshold voltage Vtc due to the connection of the charger, the charger connection detector circuit 115 outputs a charger connection detection signal SCHD to the over-discharge latch circuit 112. The charger connection detection threshold voltage Vtc is a voltage defined by the negative electrode power supply voltage VSS+0.8 V, for example. In order to pull down the external negative electrode input voltage VM until it falls below 0.8 V, the charger voltage is required to be a positive electrode power supply voltage (VDD−0.8 V) or more, namely, to be 3.6 V or more if the positive electrode power supply voltage VDD is 4.4 V.

The charger connection detector circuit 115 is configured such that it cannot output the charger connection detection signal SCHD until receiving the VM pull-up detection signal SVMPU having the high level from the VM pull-up detector circuit 114.

When receiving the over-discharge detection status signal SUVS having the high level, the over-discharge latch circuit 112 outputs the over-discharge latch signal SUVL having the high level from a latch 11L thereof. On the other hand, when receiving the charger connection detection signal SCHD having the high level, the over-discharge latch circuit 112 stops the output the over-discharge latch signal SUVL having the high level. The control circuit 113 is further configured to continue to output the over-discharge detection status signal SUVS having the high level during the time when the control circuit 113 receives the over-discharge latch signal SUVL having the high level from the over-discharge latch circuit 112. Stopping the output of each of the signals each having the high level means changing the signal level of each of the signals to the low level.

Figure 2A:
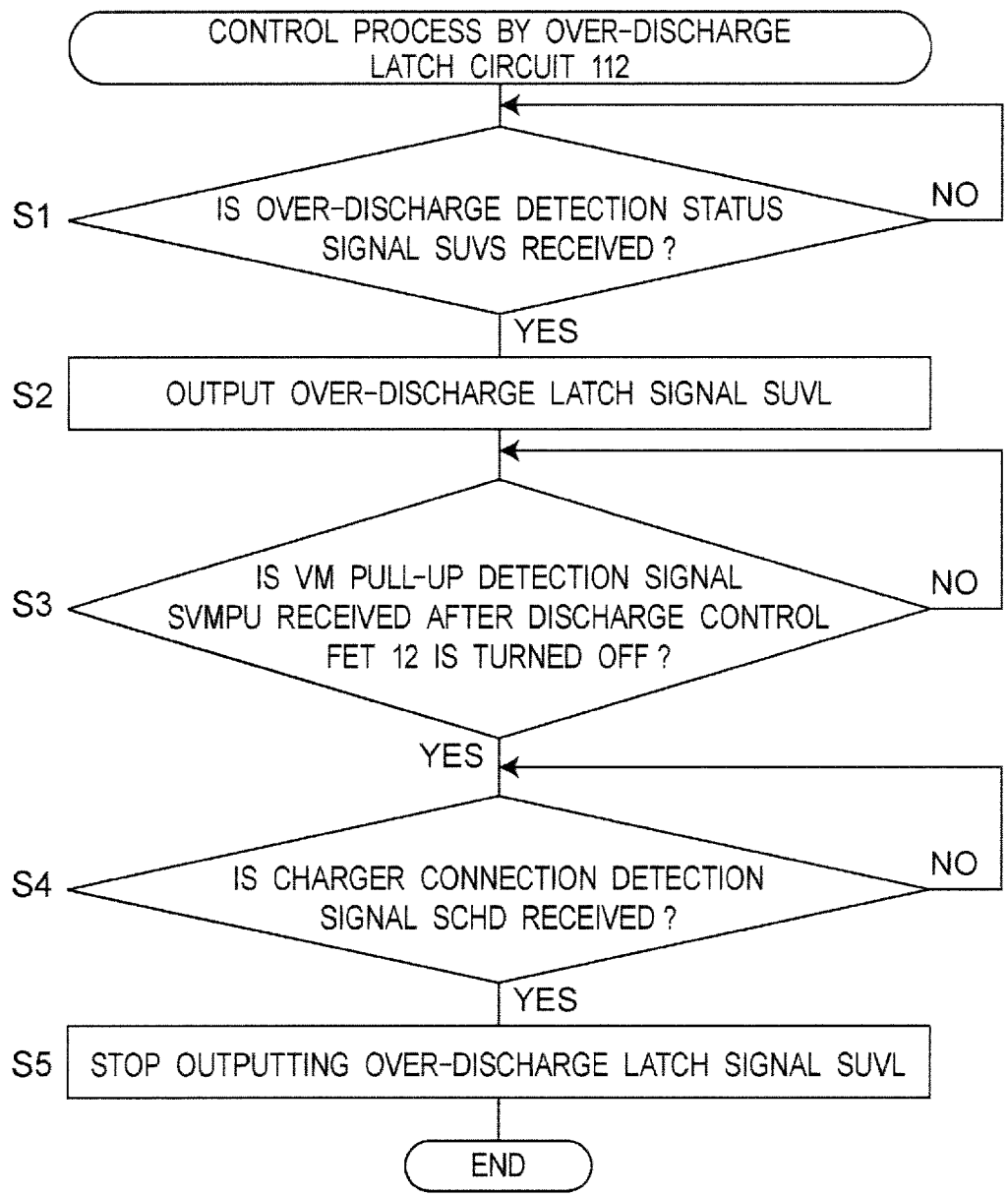
FIG. 2A is a flowchart showing a control process executed by an over-discharge latch circuit 112 of FIG. 1.

FIG. 2A is a flowchart showing a control process executed by the over-discharge latch circuit 112 of FIG. 1.

At step S1 of FIG. 2A, it is determined whether the over-discharge detection status SUVS having the high level has been received from the control circuit 113. The control flow waits in the process of step S1 until YES determination is obtained. When the YES determination is obtained, the over-discharge latch signal SUVL having the high level is outputted to the control circuit 113 at step S2. During the time when the over-discharge latch circuit 112 outputs the discharge prohibition status signal SUVS having the high level, the output of the over-discharge detection status signal SUVS is not stopped. Then, at step S3, it is determined after turning off the discharge control FET 12 whether the high VM pull-up detection signal SVMPU having the high level has been received. The control flow waits in the process of step S3 until YES determination is obtained. When the YES determination is obtained, the control flow goes to step S4. At step S4, it is determined whether the charger connection detection signal SCHD having the high level has been received from the charger connection detector circuit 115. The control flow waits in the process of step S4 until YES determination is obtained. When the YES determination is obtained, the control flow goes to step S5. At step S5, the output of the over-discharge latch signal SUVL is stopped to terminate the control process.

Figure 2B:
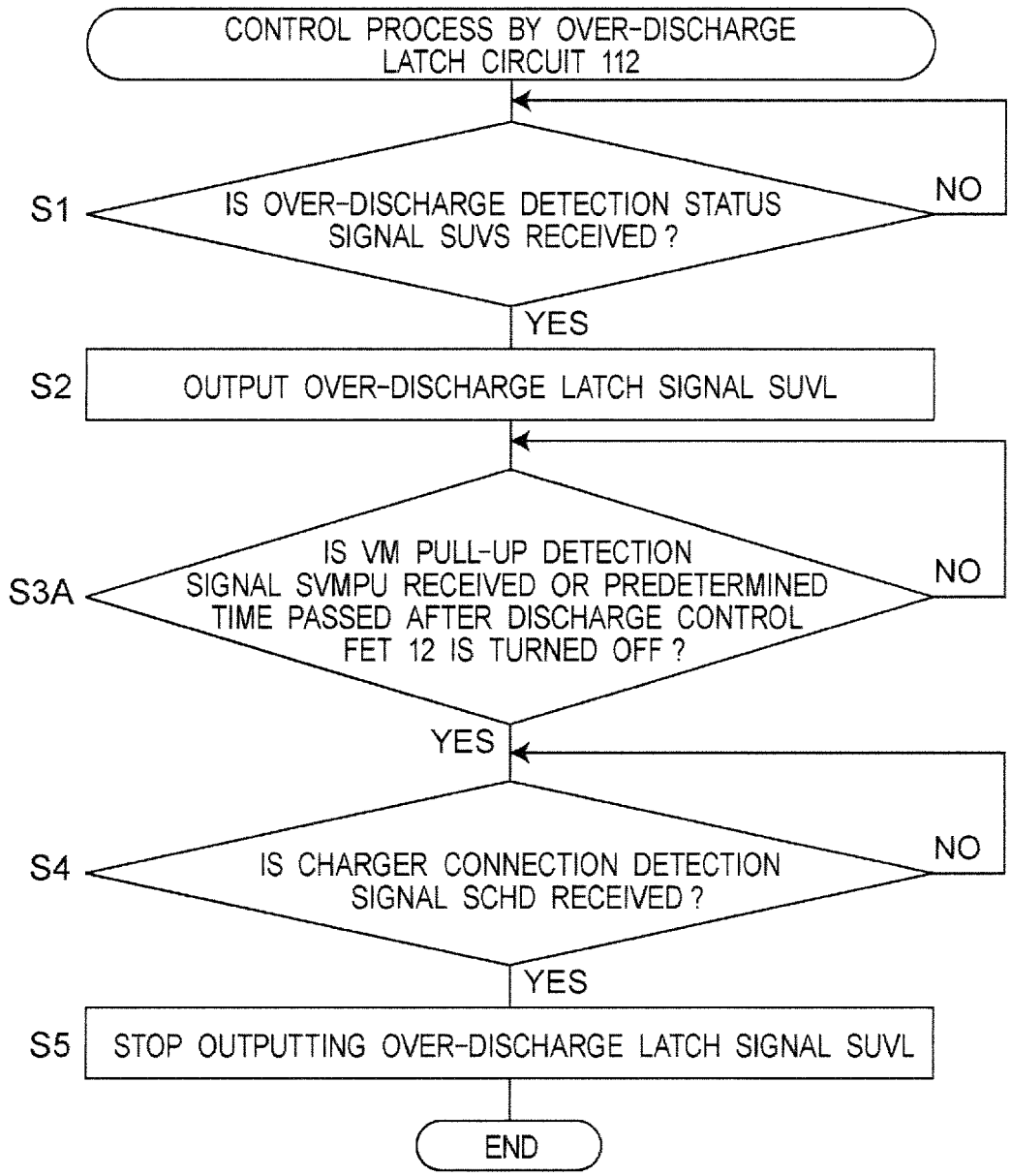
FIG. 2B is a flowchart showing a control process executed by the over-discharge latch circuit 112 according to a modified embodiment of the first embodiment.

At step S3 of FIG. 2A, determination is made of whether the VM pull-up detection signal SVMPU having the high level has been received after turning off the discharge control FET 12. However, the present invention is not limited thereto. At step S3A of FIG. 2B according to a modified embodiment of the first embodiment, it may be determined after turning off the discharge control FET 12 whether the VM pull-up detection signal SVMPU has been received or whether a predetermined time has been elapsed. Regarding the elapse of the predetermined time, the configuration may be such that the conditions of step S3A are satisfied if the delay time required to pull up the external negative electrode input voltage VM has elapsed, based on measurement made by the CPU or on the time constant calculated from the capacitance and the resistance of the load 20.

FIG. 3 is a timing chart of the voltages showing actions of the battery device 10 of FIG. 1. Referring to FIG. 3, over-discharge detection and return control actions of the battery device 10 will be described. In FIG. 3, the VM pull-up detection threshold voltage Vtp is, for example, 3.2 V, and the charger connection detection threshold voltage Vtc is, for example, 0.8 V. The charger connection detection function is disabled until pull-up of the external negative electrode input voltage VM is detected. It is assumed that the pull-up proceeds slowly because the load connected to the battery device 10 has a relatively large capacitance.

At time t1 of FIG. 3, the positive electrode power supply voltage VDD is forcibly pulled down from 4.4 V that is a battery voltage to 2.2 V. A method of forcibly pulling down includes, for example, forcibly pulling down only the positive electrode power supply voltage VDD of the positive electrode power supply terminal T1 while keeping the battery voltage as it is, by, for example, dividing the battery voltage by resistance through external control.

When the control circuit 113 enters the over-discharge detection status, and outputs the over-discharge detection status signal SUVS having the high level at time t2 after the elapse of the predetermined delay time Td1 from time t1, the over-discharge latch circuit 112 receives the over-discharge detection status signal SUVS having the high level, and latches the over-discharge detection status and outputs the over-discharge latch signal SUVL having the high level from the latch 11L to the control circuit 113. In response thereto, the control circuit 113 outputs the discharge control signal DO having the low level to the gate of the discharge control FET 12, turning off the discharge control FET 12. From time t2, the voltage of the external negative electrode terminal T22, namely, the external negative electrode input voltage VM gradually rises due to the capacitor (capacitive load) connected between the external negative electrode terminal T22 and the external positive electrode terminal T21, whose charge is discharged by the resistive load.

When the forced pull-down of the positive electrode power supply voltage VDD is released at time t3, for example, the positive electrode power supply voltage VDD returns, for example, from 2.2 V to 4.4 V that is the original battery voltage. Although during a time interval TFCHG (which is the time interval until the time when the external negative electrode input voltage VM exceeds the charger connection detection threshold voltage Vtc) measured from the time t3, the external negative electrode input voltage VM continues to be lower than the charger connection detection threshold voltage Vtc for a certain time, the discharge prohibition status can be kept without the latch in the over-discharge detection status being released because the conditions for canceling invalidation of the charger connection detection are met.

Next, at time t4, when the external negative electrode input voltage VM gradually pulled up by the external load 20 exceeds the VM pull-up detection threshold voltage Vtp that is 3.2 V, for example, the invalidation of the charger connection detection function is canceled, rendering the charger connection valid. That is, the VM pull-up detector circuit 114 outputs the VM pull-up detection signal SVMPU having the high level to the charger connection detector circuit 115 and to the over-discharge latch circuit 112.

Then, at time t5, the switch 17 is turned on, allowing connection of the charger 30 of 3.8 V, for example, so that the external negative electrode input voltage VM is pulled down to 0.6 V, for example. At this time, the charger connection detector circuit 115 outputs the charger connection detection signal SCHD having the high level to the over-discharge latch circuit 112. Since the charger connection detection threshold voltage is set to 0.8 V, the external negative electrode input voltage VM is pulled down to the VM pull-up detection threshold voltage Vtp or below, in spite of the voltage of the charger 30 lower than the positive electrode power supply voltage VDD, with the result that the charger connection detector circuit 115 can correctly determine the connection of the charger 30. When the connection of the charger 30 is detected, the over-discharge latch circuit 112 stops the output of the over-discharge status latch signal SUVL having the high level, namely, then the discharge detection status latch signal SUVL become the low level The reason why the charger connection detection threshold voltage Vtc can be set to be relatively high at 0.8 V, for example, is that, as described above, the connection of the charger 30 is prevented from being erroneously determined during the time interval TFCHG measured from time t3, by the latch immediately after the over discharge and by the restoration condition control of the over-discharge latch circuit 112 invalidating the charger connection detection until the VM pull-up detection signal SVMPU is outputted.

At time t6 after the elapse of a predetermined delay time Td2 from time t5, the control circuit 113 returns from the over-discharge detection status to the normal status.

As set forth hereinabove, according to the first embodiment of the present invention, the following unique effects can be presented. It is free from the problems of the prior art described with reference to FIGS. 4 and 5 which follow; and the shipping process time can be reduced, and the same device can return from the over-discharge detection status even when the voltage is 3.8V, which is somewhat lower than the battery voltage.

FIG. 4 is a timing chart of the voltages for explaining Problem 1 that the over-discharge latch is released and restored unintentionally from the over-discharge detection status in the battery device of the prior art.

In the first embodiment described with reference to FIGS. 1 to 3, it has been described that the feature of first embodiment lies in that the charger connection detection function releasing the over-discharge latch status is masked until detecting pull-up of the external negative electrode input voltage VM since the over-discharge latch circuit 112 outputs the discharge prohibition latch signal SUVL having the high level to obtain the over-discharge latch status immediately after the control circuit 113 has entered the over-discharge detection status.

On the contrary, the general configuration of the prior art was such that the over-discharge detection status is latched as long as the external negative electrode input voltage VM exceeds the over-discharge latch detection threshold voltage Vtl after the charge and discharge control circuit has entered the over-discharge detection status. Since the over-discharge detection status is not latched until the external negative electrode input voltage VM is pulled up, unintentional restoration from the over-discharge detection status described below has sometimes occurred. In the prior art of FIG. 4, the over-discharge latch threshold voltage Vtl is set to 0.8 V.

At time t11 of FIG. 4, the positive electrode power supply voltage VDD is forcibly pulled down from 4.4 V that is the battery voltage to 2.2 V. Then, at time t12, the charge and discharge control circuit enters the over-discharge detection status, turning off the discharge control FET 12. In the prior art, when the external negative electrode input voltage VM does not exceed the over-discharge latch threshold voltage Vtl, a discharge latch release signal SUVLR having the high level is outputted. Furthermore, at time t13, the forced pull-down of the battery voltage is canceled allowing the positive electrode power supply voltage VDD that is the battery voltage to return from 2.2 V, for example, to its original 4.4 V.

At time t14 of FIG. 4, since the external negative electrode input voltage VM does not exceed the over-discharge latch threshold voltage Vtl till the lapse of a predetermined delay time from time t12, the charge and discharge control circuit 11 returns unintentionally from the over-discharge detection status. That is, if the over-discharge latch threshold voltage Vtl is set to be relatively high in the circuit configuration of the prior art, the above Problem 1 occurs that the charge and discharge control circuit returns unintentionally from the over-discharge detection status.

FIG. 5 is a timing chart of the voltages for explaining Problem 2 that the return from the over-discharge detection status to the over-discharge latch release is impossible in the battery device of the prior art.

According to anther prior art technique, Problem 1 described in FIG. 4 that the charge and discharge control circuit returns unintentionally from the over-discharge detection status, is overcome by lowering the above over-discharge latch threshold voltage Vtl. This prior art technique also has such a configuration that the over-discharge detection status is latched by detecting the pull-up of the external negative electrode input voltage VM beyond the over-discharge latch threshold voltage Vtl after the charge and discharge control circuit 11 has entered the over-discharge detection status. In the example of FIG. 5, the over-discharge latch threshold voltage Vtl is set to 0.2 V.

At time t21 of FIG. 5, the positive electrode power supply voltage VDD is forcibly pulled down, for example, from 4.4 V that is the battery voltage to 2.2 V. Then, at time t22, the charge and discharge control circuit enters the over-discharge detection status, turning off the discharge control FET 12. In the prior art, when the external negative electrode input voltage VM does not exceed the over-discharge latch threshold voltage Vtl, the discharge latch release signal SVMPU having the high level is outputted. Furthermore, at time t23, the forced pull-down of the positive electrode power supply voltage VDD is released, allowing the positive electrode power supply voltage VDD to return, for example, from 2.2 V to its original 4.4 V. At this time, the external negative electrode input voltage VM just exceeds the over-discharge latch threshold voltage Vtl, allowing the over-discharge detection status to be latched. Thereafter, at time t24, a charger of 3.8 V, for example, is connected and the external negative electrode input voltage VM is pulled down to 0.6 V, for example. However, the over-discharge latch status cannot be canceled since the external negative electrode input voltage VM does not fall below 0.2 V that is the over-discharge latch threshold voltage Vtl. That is, if the over-discharge latch threshold voltage Vtl is set to the low level, Problem 1 described with reference to FIG. 4 can be solved that unintentional restoration from the protection status occurs, but other Problem 2 arises that the latch cannot be released by a low-voltage charger.

Accordingly, the embodiments of the present invention are intended to solve the above Problems 1 and 2.

Second Embodiment

Figure 6:
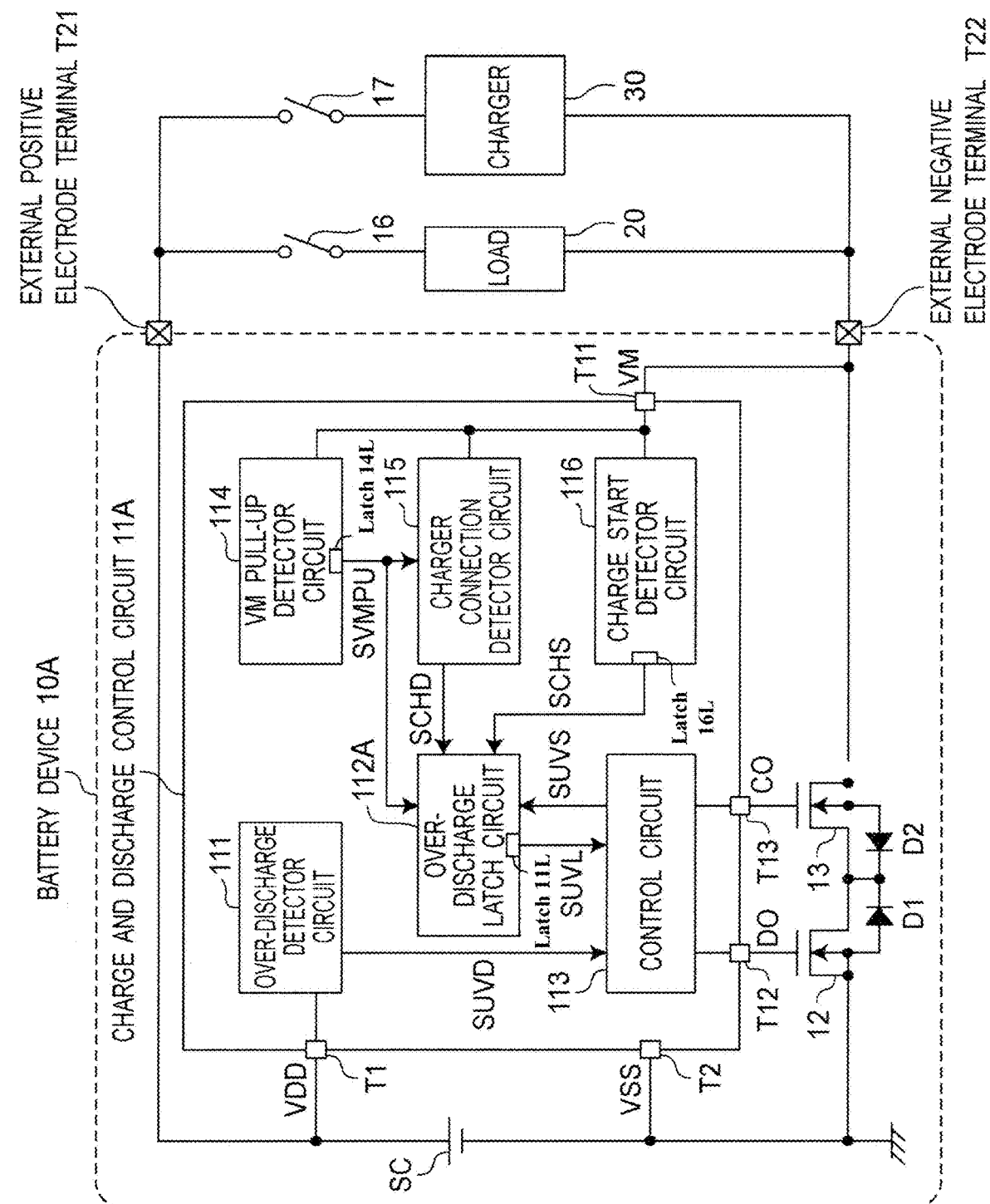
FIG. 6 is a block diagram showing a configuration example of a battery device 10A according to a second embodiment.

FIG. 6 is a block diagram showing a configuration example of a battery device 10A according to the second embodiment.

Referring to FIG. 6, the battery device 10A according to the second embodiment has the following differences compared with the battery device 10 of the first embodiment of FIG. 1:
(1) the battery device 10A includes a charge and discharge control circuit 11A in place of the charge and discharge control circuit 11;
(2) the charge and discharge control circuit 11A is characterized in that it further comprises a charge start detector circuit 116 compared with the charge and discharge control circuit 11; and
(3) the battery device 10A includes, in lieu of the over-discharge latch circuit 112, an over-discharge latch circuit 112A that receives a charge start detection signal SCHS having the high level to further perform a predetermined process.

The differences will hereinafter be described.

Referring to FIG. 6, the charge start detector circuit 116 compares the external negative electrode input voltage VM with the charge start detection threshold voltage Vts, and when detecting VM<Vts, determines that charge has been started, and outputs the charge start detection signal SCHS from a latch 16L thereof to the over-discharge latch circuit 112A. The charge and discharge control circuit 11A according to the second embodiment is characterized in that the charge start detection threshold voltage Vts is a voltage that enables detection of the external negative electrode input voltage VM of the external negative electrode voltage input terminal T11 being substantially equal to or lower than the negative electrode voltage of the secondary battery SC. The charge start detection threshold voltage Vts is a voltage defined by the negative electrode power supply voltage VSS+0 V, for example. Considering the negative electrode power supply voltage VSS as a reference, the charge start detection voltage is 0V or may be a minute negative voltage such as –0.01 V, for example.

The over-discharge latch circuit 112A is configured such that when not receiving the VM pull-up detection latch signal SVMPU, the over-discharge latch circuit 112A ignores and disables the charger connection detection signal SCHD from the charger connection detector circuit 115 but does not disable the charge start detection signal SCHS from the charge start detector circuit 116. That is, irrespective of the external negative electrode input voltage VM, immediately after receiving the over-discharge detection status signal SUVS, the over-discharge latch circuit 112A outputs the discharge detection status latch signal SUVL having the high level and migrates to the discharge prohibition status and outputs the discharge control signal DO having the low level to the discharge control FET 12, and this leads to turning off the discharge control FET 12. When receiving the charger connection detection signal SCHD having the high level or the charge start detection signal SCHS having the high level, the over-discharge latch circuit 112A stops the output of the discharge prohibition latch signal SUVL.

A description will then be given below of a specific use case of stopping the output of the discharge prohibition latch signal SUVL by the charge start detection signal SCHS.

Immediately after the discharge control FET 12 has been turned off or, when the charger 30 as described above has been connected before that, immediately after the discharge control FET 12 has turned off, the external negative electrode input voltage VM is pulled down by the forward voltage Vf of the parasitic diode D1. In consequence, the external negative electrode input voltage VM falls below the charge start detection threshold voltage Vts immediately after the discharge control FET 12 has been turned off, allowing the charge start detector circuit 116 to output the charge start detection signal SCHS having the high level to stop the output of the discharge prohibition latch signal SUVL. This can prevent the charge current from continuing to flow with the discharge control FET 12 being turned off, with the result that the discharge control FET 12 having a relatively small allowable loss can be used for the battery device 10A, contributing to achievement of cost down of the battery device 10A.

Figure 7:
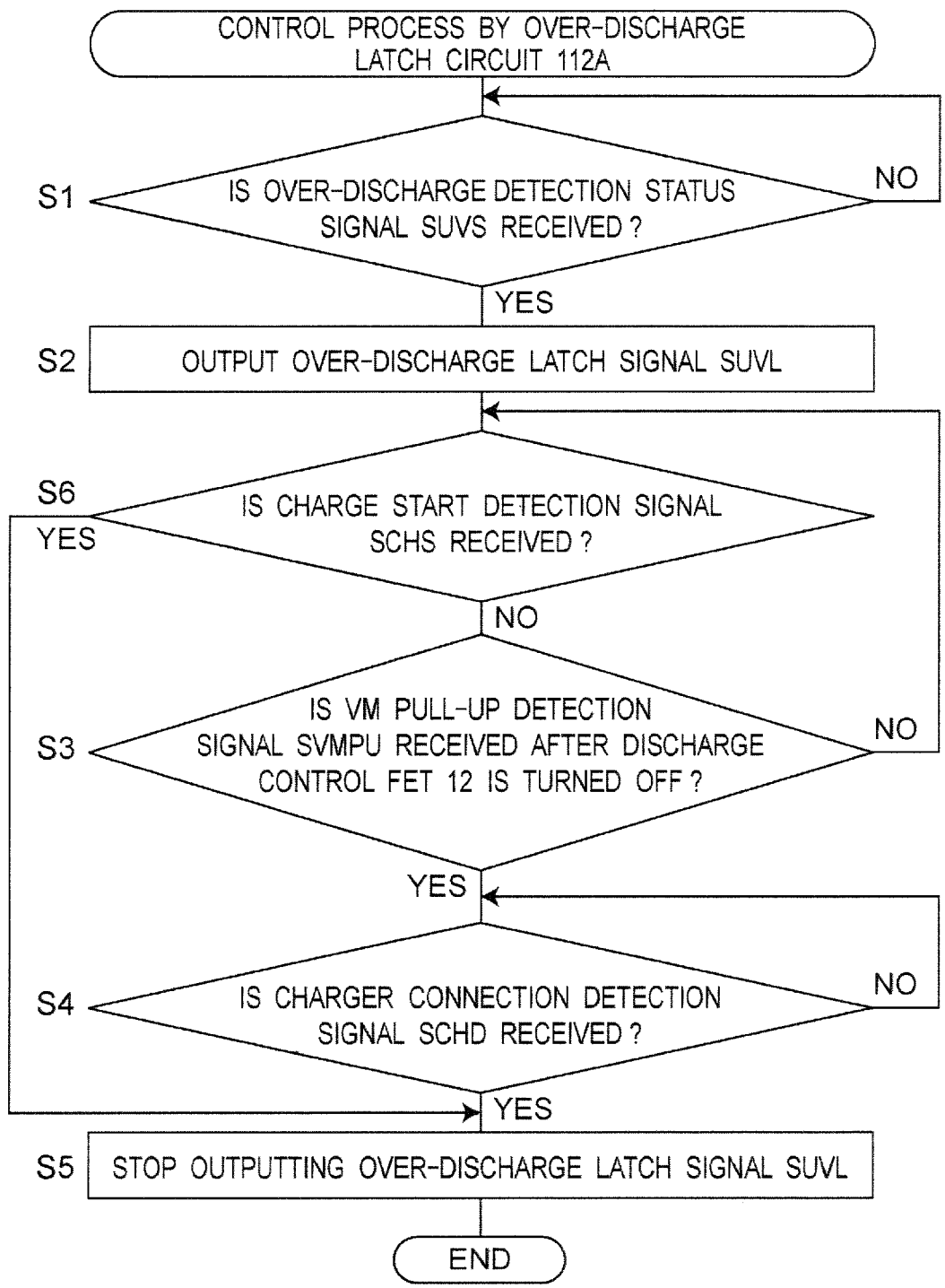
FIG. 7 is a flowchart showing a control process executed by an over-discharge latch circuit 112A of FIG. 6.

FIG. 7 is a flowchart showing a control process executed by the over-discharge latch circuit 112A of FIG. 6. The control process of FIG. 7 has the following differences compared with the control process of FIG. 2A:
(1) A determination branching process of step S6 is inserted between steps S2 and S3. At step S6, it is determined whether the charge start detection signal SCHS has been received, and if YES, the procedure jumps to step S5, whereas if NO, the procedure goes to step S3. That is, if the above Condition C is satisfied at step S6, the output of the discharge prohibition latch signal is stopped at step S5 even if the above conditions are not met. As described above, the Condition C is that start of charge has been detected based on the external negative electrode input voltage VM.

As set forth hereinabove, according to the second embodiment, the over-discharge detection latch circuit 112A is characterized in that when receiving the charge start detection signal SCHS, the over-discharge detection latch circuit 112A stops the output of the discharge prohibition latch signal SUVL even if the over-discharge detection latch circuit 112A does not receive the charger connection detection signal SCHD.

Figure 8:
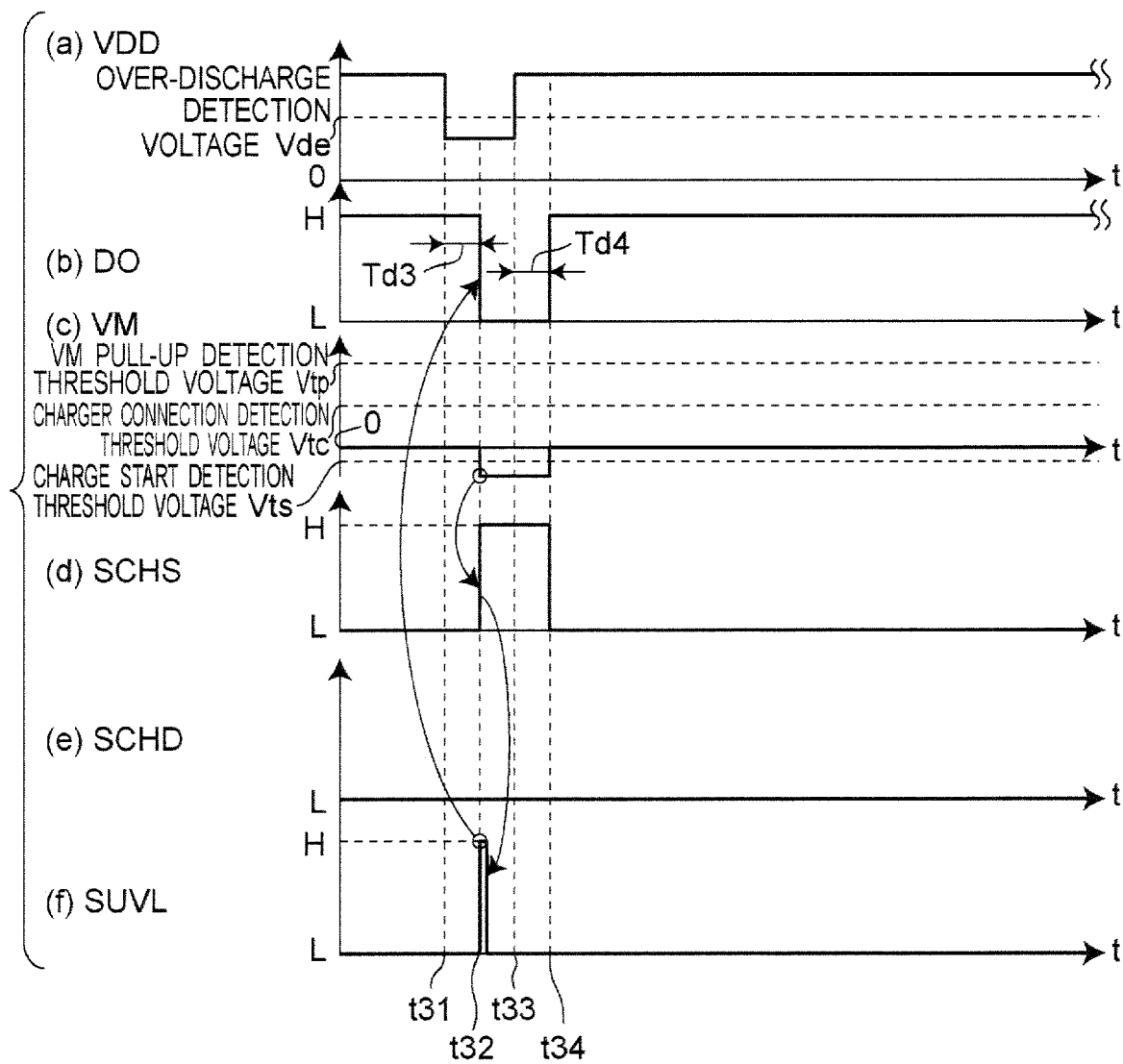
FIG. 8 is a timing chart of the voltages, showing actions of the battery device 10A of FIG. 6.

FIG. 8 is a timing chart of the voltages, showing actions of the battery device 10A of FIG. 6, showing control actions for the over-discharge detection and return according to the battery device 10A. In FIG. 8:

(1) the VM pull-up detection threshold voltage Vtp is 3.2 V, for example;
(2) the charger connection detection threshold voltage Vtc is 0.8 V, for example; and
(3) the charge start detection threshold voltage Vts is −0.1 V, for example.

Although in this second embodiment the charger connection detection function is disabled until the VM pull-up is detected, the charge start detection function is not disabled. At a point of time anterior to time t31 of FIG. 8, it is assumed that the charger 30 capable of outputting up to 5.0 V, for example is connected to the battery device 10A.

At time t31 of FIG. 8, the positive electrode power supply voltage VDD is forcibly pulled down, for example, from 4.4 V that is the battery voltage to 2.2 V. Then, at time t32 after the elapse of a predetermined time Td3 from time t31, the control circuit 113 enters the over-discharge detection status and outputs the discharge control signal DO having the low level to the gate of the discharge control FET 12, and this leads to turning off the discharge control FET 12. However, when the discharge control FET 12 is turned off, a charge current flows through the parasitic diode D1 of the discharge control FET 12, so that the external negative electrode input voltage VM is pulled down by the forward voltage Vf of the parasitic diode D1, falling below the charge start detection threshold voltage Vts. At this time, the charger connection detector circuit 115 is disabled and hence does not receive the charger connection detection signal SCHD having the high level, whereas the charge start detector circuit 116 is not disabled, and therefore, outputs the charge start detection signal SCHS to stop the output of the discharge prohibition latch signal SUVL whose output has just been started.

Next, at time t33, the forced pull-down of the positive electrode power supply voltage VDD is canceled, allowing the positive electrode power supply voltage VDD to return, for example, from 2.2 V to its original 4.4 V. Then, at time t34 after the elapse of a predetermined delay time Td4 from time t33, the control circuit 113 returns from the over-discharge detection status to its normal status.

As described above, according to the second embodiment, in the case that the charge and discharge control circuit 11A enters the over-discharge detection status and turns off the discharge control FET 12 in the status where the charger 30 is connected with the switch 17 turned on, start of charge can be detected based on the external negative electrode input voltage VM. When the charge and discharge control circuit 11A detects the start of charge based on the charge start detection signal SCHS, output of the discharge prohibition latch signal SUVL is stopped irrespective of the presence or absence of the charger connection detection signal SCHD. Accordingly, if the positive electrode power supply voltage VDD as the battery voltage exceeds the over-discharge detection voltage Vde, the charge and discharge control circuit 11A returns from the over-discharge detection status after the elapse of the predetermined delay time Td4. This can reduce the damage that the charge current continuing to flow by way of the parasitic diode D1 of the discharge control FET 12 imparts to the discharge control FET 12.

The second embodiment presents also the following operative effects described in the first embodiment:
(1) the charge and discharge control circuit 11A is prevented from erroneously determining the charger connection and erroneously returning from the forced stand-by status immediately after the charge and discharge control circuit 11 has switched the discharge control signal from the high level to the low level to inhibit the discharge; and (2) since the charger connection detection threshold voltage Vtc can be set to a relatively high voltage, even if the charger 30 of a low voltage has been connected, the charge and discharge control circuit 11A can reliably detect the same case, and switch the discharge control signal DO from the low level to the high level.

Furthermore, according to the second embodiment, in the case where the charger 30 has been connected before canceling invalidation of the charger connection detection, a control is added that stops the output of the discharge prohibition latch signal SUVL based on the charge start detection signal SCHS. This leads to that the charge and discharge control circuit 11A can instantly switch the discharge control FET 12 from the low level to the high level in the case that the charger 30 flows the current by way of the parasitic diode D1 of the discharge control FET 12.

In order to supplement further explanation, a purpose of the return logic control based on the charge start detection added in the second embodiment is to reduce the damage to the discharge control FET 12. Given this purpose, it is desirable that the discharge control FET 12 be turned on in the shortest possible time when the charge start detection signal SCHS has been outputted. To that end, the control logic circuit may be configured to provide control that allows the charge and discharge control circuit 11A to return from the over-discharge detection status irrespective of the battery voltage while stopping the output of the discharge prohibition latch signal SUVL.

First Modified Embodiment

Figure 9:
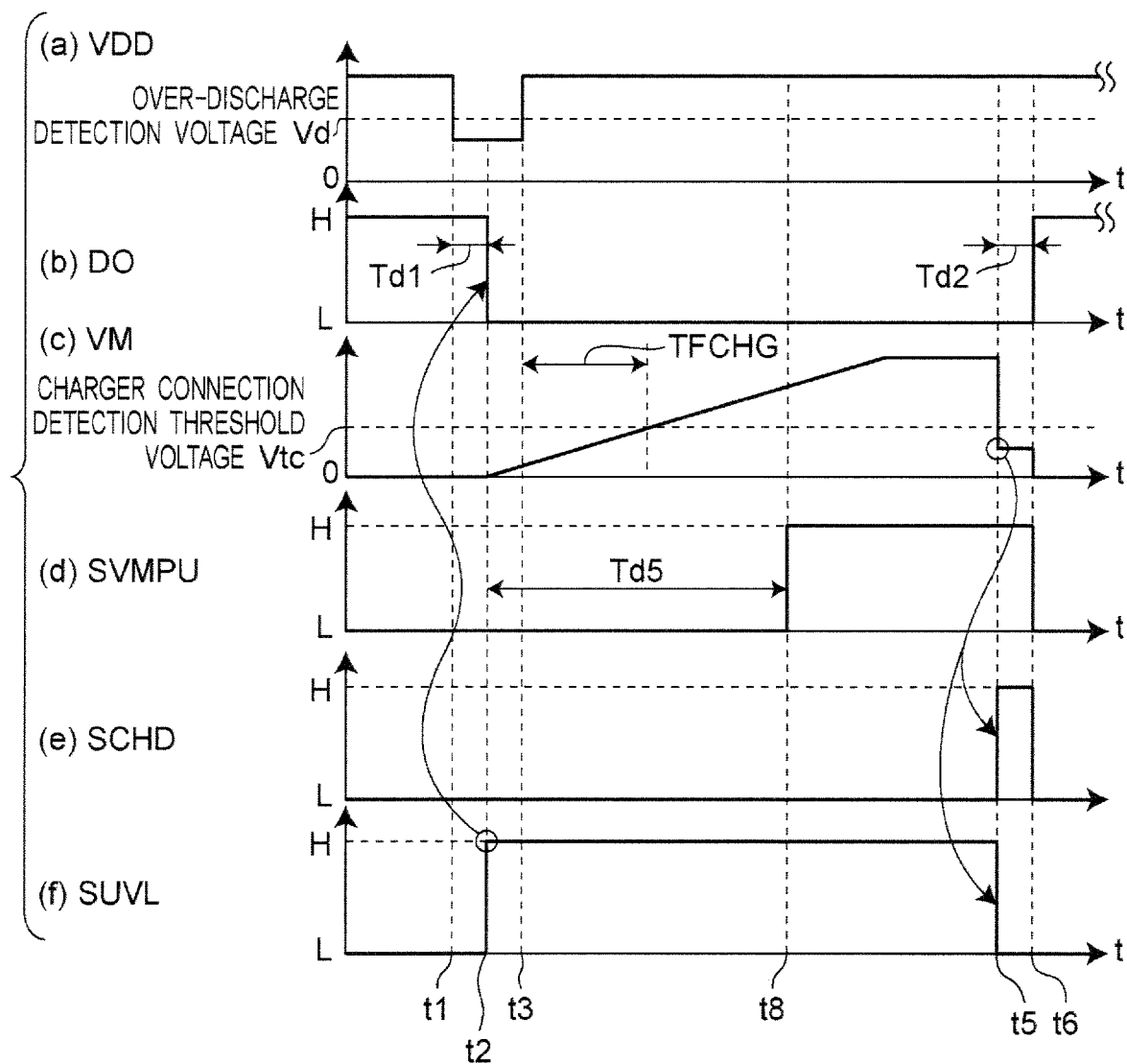
FIG. 9 is a timing chart of the voltages, showing actions of a battery device according to a first modified embodiment.

FIG. 9 is a timing chart of the voltages showing actions of a battery device according to a first modified embodiment.

In the above first and second embodiments, it has been assumed that masking of the charger connection detector circuit 115 is canceled by the VM pull-up detection signal SVMPU generated based on the voltage detection of the VM pull-up detector circuit 114. However, the present invention is not limited thereto. The gist of the present invention lies in that it is necessary for solving the Problems 1 and 2 described in FIGS. 4 and 5 to enable the charger connection to be detected only after certain specific conditions have been met. For example, as shown in FIG. 9, the control logic of the charge and discharge control circuit 11, 11A, and 11b may be configured such that the charger connection detector circuit 115 is disabled till time t8 after the elapse of a predetermined delay time Td5, which is required for the external negative electrode input voltage VM to be fully pulled up after turning off the discharge control FET 12. Then, at time t8, the VM pull-up detection signal SVMPU having the high level is generated. The predetermined delay time Td5 is selected in consideration of a time constant calculated from the load capacitance and the load resistance. Also in the case of employing the control logic that disables the charger connection detector circuit by the predetermined delay time Td5 in this manner, when configured to include the charge start detection described in the second embodiment, the configuration is made to cancel the output of the discharge prohibition latch signal SUVL even if the predetermined delay time Td5 has not elapsed.

Second Modified Embodiment

Figure 10:
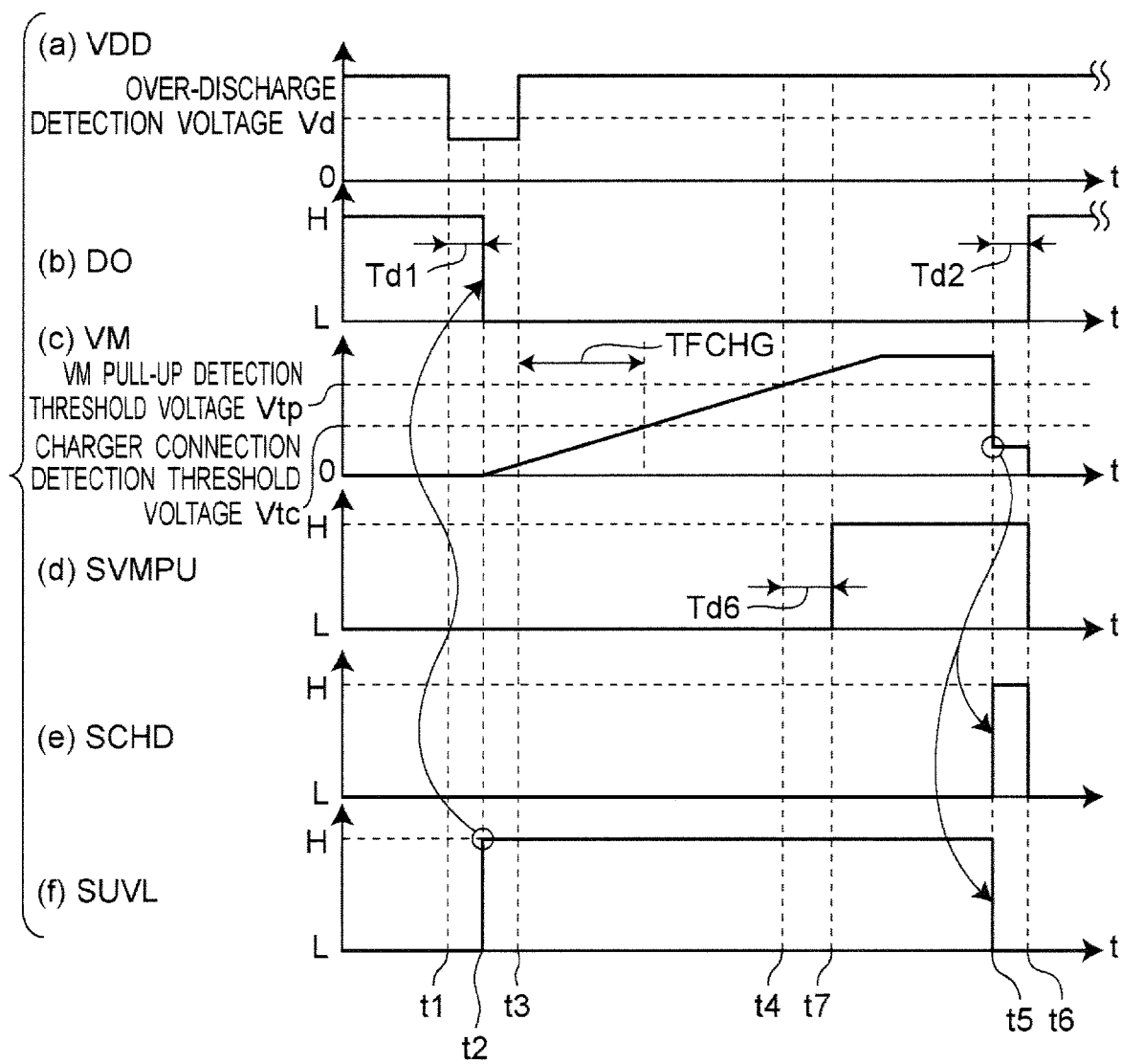
FIG. 10 is a timing chart of the voltages, showing actions of a battery device according to a second modified embodiment.

FIG. 10 is a timing chart of the voltages, showing actions of a battery device according to a second modified embodiment. In the first modified embodiment of FIG. 9, the VM pull-up detection signal SVMPU has been outputted when the predetermined delay time Td5 has elapsed after turning off the discharge control FET 12. However, the present invention is not limited thereto. As shown in FIG. 10, the configuration may be such that, after the external negative electrode input voltage VM gradually pulled up by the external load 20 has exceeded the VM pull-up detection threshold voltage Vtp that is 3.2 V, for example, at time t4, the VM pull-up detection signal SVMPU having the high level is outputted at time t7 after the elapse of a predetermined delay time Td6.

Third Modified Embodiment

Figure 11:
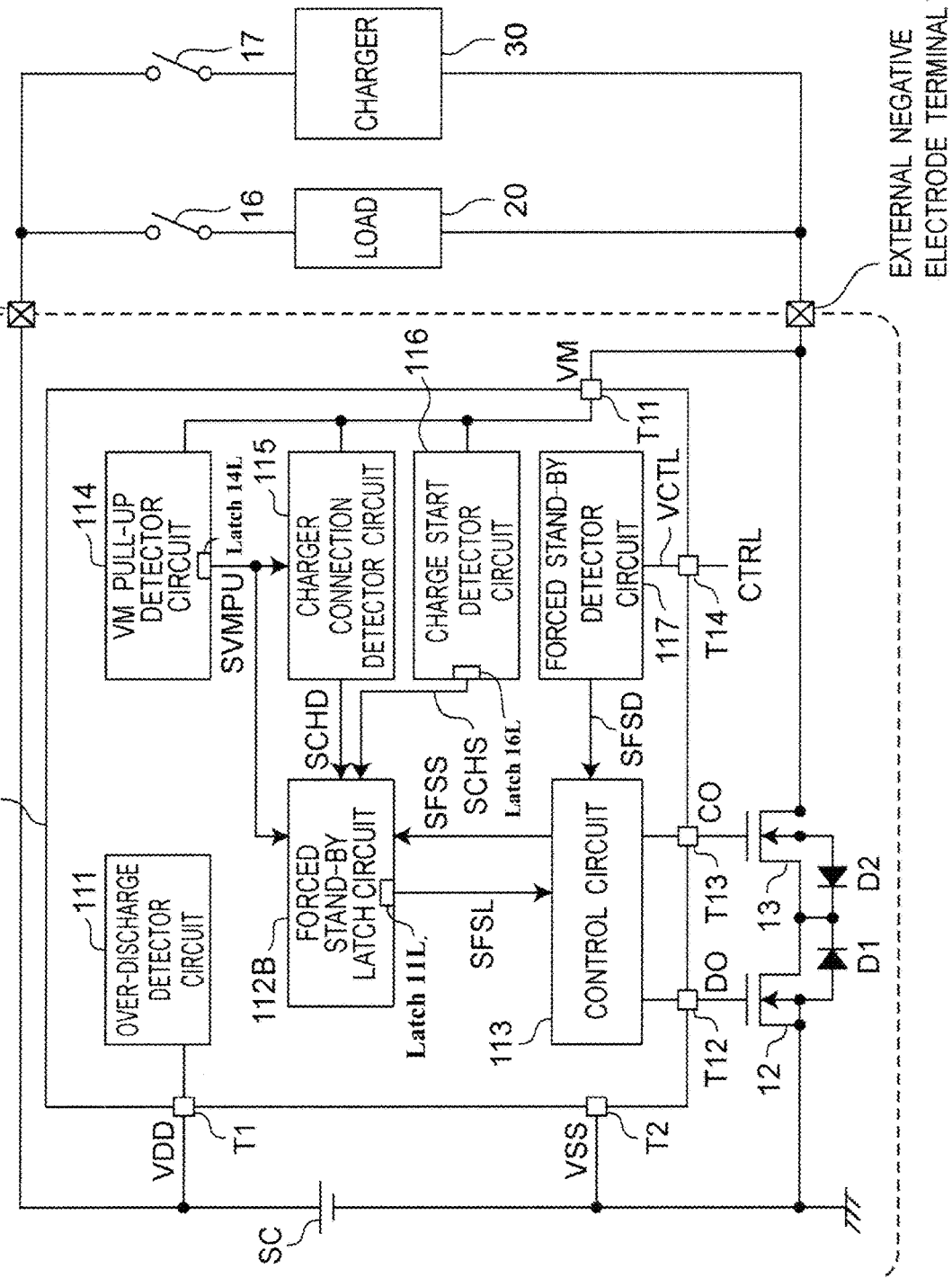
FIG. 11 is a block diagram showing a configuration example of a battery device 10B according to a third modified embodiment.

FIG. 11 is a block diagram showing a configuration example of a battery device 10B according to a third modified embodiment. The battery device 10B of the third modified embodiment of FIG. 11 has the following differences compared with the battery device 10A of FIG. 6:

(1) the battery device 10B includes a charge and discharge control circuit 11B instead of the charge and discharge control circuit 11A;
(2) the battery device 10B includes a forced stand-by latch circuit 112B instead of the over-discharge latch circuit 112A; and
(3) the charge and discharge control circuit 11B further includes a forced stand-by signal input terminal T14 and a forced stand-by detector circuit 117.

The differences will be described below.

Referring to FIG. 11, the forced stand-by detector circuit 117 detects a forced stand-by signal VCTL input to the forced stand-by signal input terminal T14, and outputs a forced stand-by detection signal SFSD having the high level to the control circuit 113.

After the elapse of the predetermined delay time Td1 after reception of the forced stand-by detection signal SFSD having the high level, the control circuit 113 outputs a forced stand-by detection status signal SFSS having the high level to the forced stand-by latch circuit 112B, and outputs the discharge control signal DO having the low level via the discharge control terminal T12 to the gate of the discharge control FET 12, to prohibit discharge from the secondary battery SC.

The forced stand-by latch circuit 112B outputs a forced stand-by latch signal SFSL having the high level from the latch 11L thereof when receiving the forced stand-by detection status signal SFSS having the high level and stops the output of the forced stand-by latch signal SFSL having the high level when receiving the charger connection detection signal SCHD having the high level. The control circuit 113 is configured to continue to output the forced stand-by detection status signal SFSS having the high level during receiving the forced stand-by latch signal SFSL having the high level from the forced stand-by latch circuit 112B. Stopping the output of high signals refers to changing the signal levels of the signals to the low level.

Figure 12:
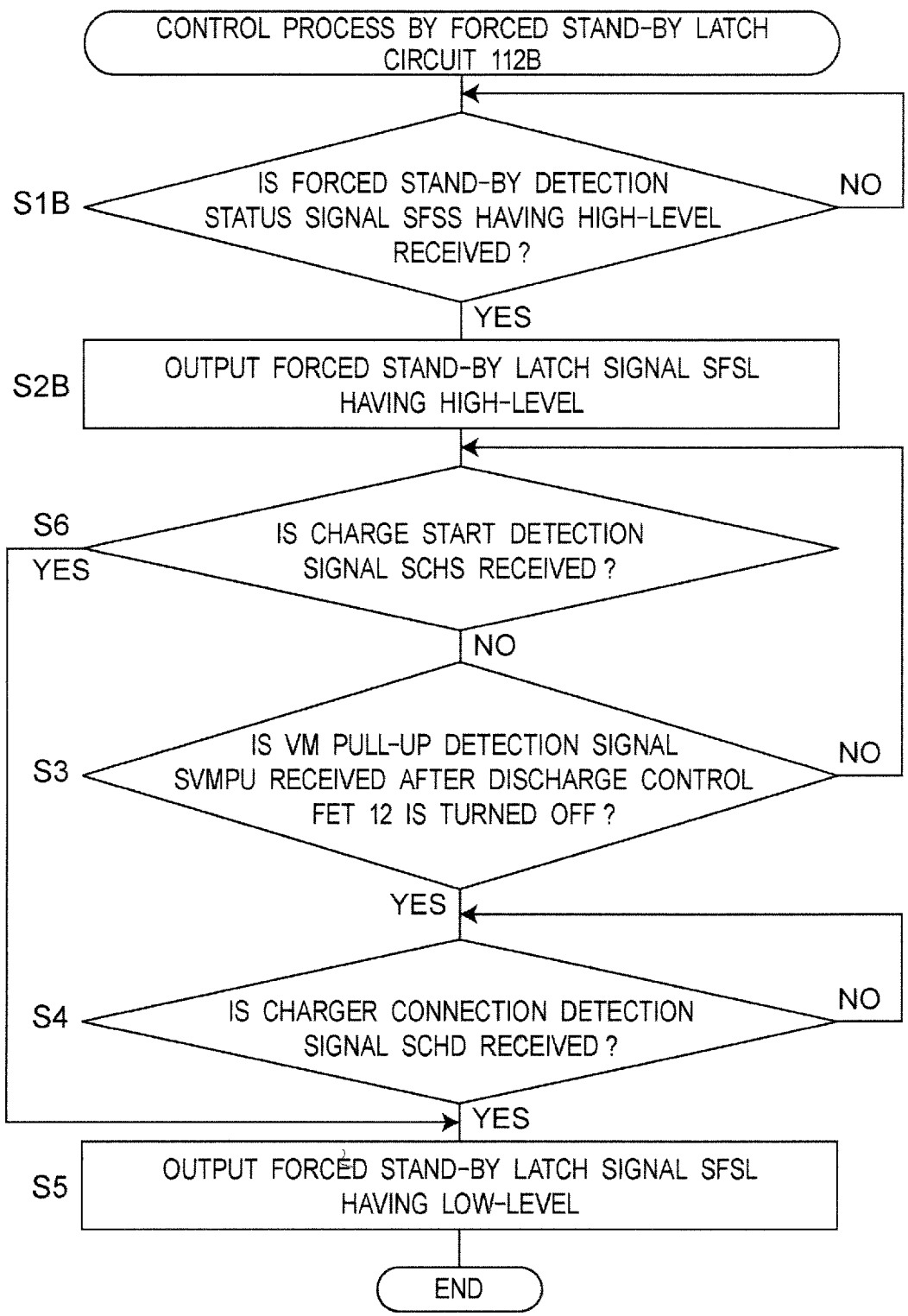
FIG. 12 is a flowchart showing a control process executed by a forced stand-by latch circuit 112B of FIG. 11.

FIG. 12 is a flowchart showing a control process executed by the forced stand-by latch circuit 112B of FIG. 11. The control process of FIG. 12 has the following differences compared with the control process of FIG. 7:

(1) the control process includes step S1B in place of step S1. At step S1B, it is determined whether the forced stand-by detection status signal SFSS having the high level has been received;
(2) the control process includes step S2B in place of step S2. At step S2B, the forced stand-by latch signal SFSL having the high level is outputted; and (3) the control process includes step S5B in place of step S5. At step S5b, the forced stand-by latch signal SFSL having the low level is outputted.

In the above first and second embodiments, the method of forcibly detecting the over-discharge has been described as an example of means for entering the forced stand-by status. However, in the third modified embodiment, the means for entering the forced stand-by status may be implemented by the charge and discharge control circuit 11B further including the forced stand-by signal input terminal T14 and the forced stand-by detector circuit 117 so that when receiving an external forced stand-by signal VCTL, the forced stand-by detector circuit 117 outputs the forced stand-by detection signal SFSD while the control circuit 113 having received the forced stand-by detection signal SFSD outputs the forced stand-by detection status signal SFSS after the elapse of a predetermined delay time, to control the discharge control signal DO to be the low level.

Although the third modified embodiment has been an example applied to the second embodiment, the present invention is not limited thereto, but may be applied to the first embodiment.

The charge and discharge control circuit 11B may include both of the over-discharge latch circuit 112A and the forced stand-by latch circuit 112B. At this time, the over-discharge latch circuit 112A and the forced stand-by latch circuit 112B may be configured to have a common circuit portion.

Other Modified Embodiments

All the functions including the charger connection detection as one of the restoration conditions are the subject of the present invention.

In the above first and second embodiments and modified embodiments, the control circuit 113 of FIGS. 1, 6, and 11 may be configured to output a power-down signal putting the charge and discharge control circuits 11, 11A, and 11B in the power down status when receiving the VM pull-up detection signal SVMPU having the high level from the VM pull-up detector circuit 114.

Figure 13:
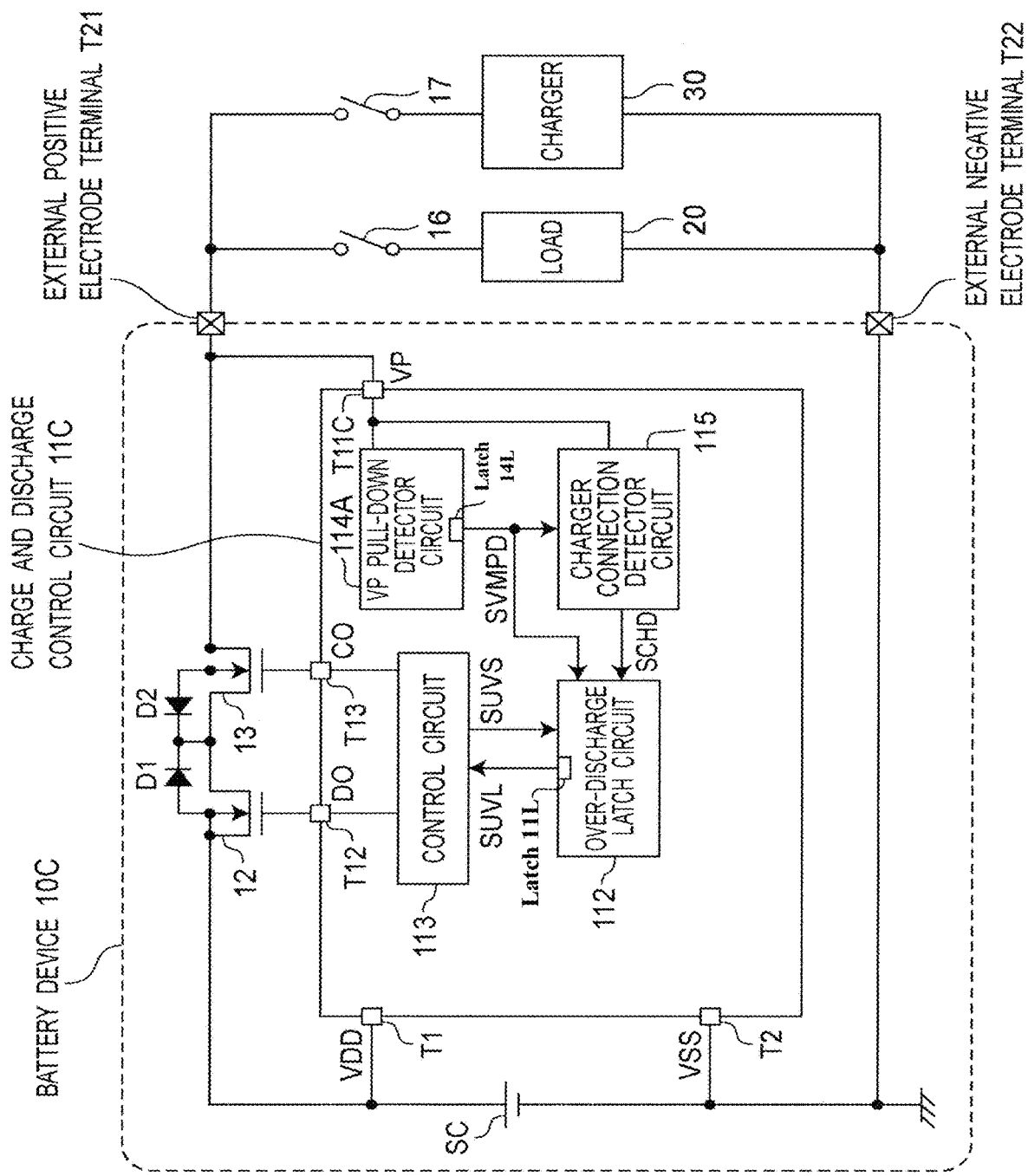
FIG. 13 is a block diagram showing a configuration example of a battery device 10C according to a fourth modified embodiment.

In the above first and second embodiments and modified embodiments, the description has been made assuming that the discharge control FET 12 and the charge control FET 13 are connected in series between the negative electrode terminal (namely, the negative electrode power supply terminal T2) of the secondary battery SC and the external negative electrode terminal T22. However, the present invention is not limited thereto, but the discharge control FET 12 and the charge control FET 13 may be connected in series between the positive electrode terminal (namely, the positive electrode power supply terminal T1) of the secondary battery CS and the external positive electrode terminal T21. This case is described as a fourth modified embodiment. FIG. 13 shows a configuration example of a battery device 10C according to the fourth modified embodiment.

The battery device 10C of FIG. 13 includes a charge and discharge control circuit 11C instead of the charge and discharge control circuits 11, 11A, and 11B. The external negative electrode voltage input terminal T11 monitoring the external negative electrode input voltage VM may be replaced by an external positive electrode voltage input terminal T11C for monitoring an external positive electrode input voltage VP of the external positive electrode terminal T21, while the VM pull-up detector circuit 114 may be replaced by a VP pull-down detector circuit 114A. In this case, the pull-up and pull-down motions of the external positive electrode input voltage VP are reversed in polarity to those of the external negative electrode input voltage VM described in the embodiments.

Although the embodiments of the present invention have been set forth hereinabove, it is natural that the present invention may variously be changed or combined without being limited to the above embodiments and without departing from the gist of the present invention.

INDUSTRIAL APPLICABILITY

As mentioned above in detail, according to the charge and discharge control circuit of the present invention, even when connecting the charger with the voltage lower than the predetermined value with the discharge control FET being turned off by the charge and discharge control circuit of the battery device, it is possible to identify the connection of the charger safely and reliably.

The invention claimed is:

1. A charge and discharge control circuit configured to control charge and discharge of a secondary battery connected between a positive electrode power supply terminal and a negative electrode power supply terminal by using a discharge control switching element and a charge control switching element connected between the secondary battery and a load or a charger, the charge and discharge control circuit comprising:
a charger connection detector circuit that generates a charger connection detection signal, based on a voltage of an external negative electrode terminal connected to the charger; and
a pull-up detector circuit that detects a pull-up of the voltage of the external negative electrode terminal, based on the voltage of the external negative electrode terminal, and generates a pull-up detection signal,
wherein the charge and discharge control circuit is configured to turn off the discharge control switching element, and then, is controlled not to receive the charger connection detection signal until receiving the pull-up detection signal, and is configured to turn on the discharge control switching element after receiving the pull-up detection signal and receiving the charger connection detection signal.

2. The charge and discharge control circuit as claimed in claim 1,
wherein the charger connection detector circuit compares the voltage of the external negative electrode terminal connected to the charger with a first threshold voltage higher than a negative electrode voltage of the secondary battery, thereby detecting a connection of the charger.

3. The charge and discharge control circuit as claimed in claim 2,
wherein the pull-up detector circuit compares the voltage of the external negative electrode terminal with a second threshold voltage higher than the first threshold voltage, thereby detecting the pull-up of the voltage of the external negative electrode terminal.

4. The charge and discharge control circuit as claimed in claim 3,
wherein the pull-up detector circuit detects the pull-up of the external negative electrode terminal when the voltage of the external negative electrode terminal reaches the second threshold voltage.

5. The charge and discharge control circuit as claimed in claim 1, further comprising a charge start detector circuit that compares the voltage of the external negative electrode terminal with a third threshold voltage, thereby detecting a start of charge by the charger, and generates a charge start detection signal,
wherein the charge and discharge control circuit is configured to turn off the discharge control switching element, and then, turn on the discharge control switching element when receiving the charge start detection signal, irrespective of the pull-up detection signal and the charger connection detection signal.

6. A battery device comprising:
a charge and discharge control circuit configured to control charge and discharge of a secondary battery connected between a positive electrode power supply terminal and a negative electrode power supply terminal by using a discharge control switching element and a charge control switching element connected between the secondary battery and a load or a charger;
the secondary battery;
the discharge control switching element; and
the charge control switching element,
wherein the charge and discharge control circuit comprises:
a charger connection detector circuit that generates a charger connection detection signal, based on a voltage of an external negative electrode terminal connected to the charger; and
a pull-up detector circuit that detects a pull-up of the voltage of the external negative electrode terminal, based on the voltage of the external negative electrode terminal, and generates a pull-up detection signal,
wherein the charge and discharge control circuit is configured to turn off the discharge control switching element, and then, is controlled not to receive the charger connection detection signal until receiving the pull-up detection signal, and is configured to turn on the discharge control switching element after receiving the pull-up detection signal and receiving the charger connection detection signal.

7. A charge and discharge control method executed by a charge and discharge control circuit configured to control charge and discharge of a secondary battery connected between a positive electrode power supply terminal and a negative electrode power supply terminal by using a discharge control switching element and a charge control switching element connected between the secondary battery and a load or a charger, the charge and discharge control method comprising the steps of:
by a charger connection detector circuit, generating a charger connection detection signal, based on a voltage of an external negative electrode terminal connected to the charger;
by a pull-up detector circuit, detecting a pull-up of the voltage of the external negative electrode terminal, based on the voltage of the external negative electrode terminal, and generating a pull-up detection signal;
by the charge and discharge control circuit, turning off the discharge control switching element, and then, being controlled not to receive the charger connection detection signal until receiving the pull-up detection signal after; and
by the charge and discharge control circuit, turning on the discharge control switching element after receiving the pull-up detection signal and receiving the charger connection detection signal.

8. A charge and discharge control circuit configured to control charge and discharge of a secondary battery connected between a positive electrode power supply terminal and a negative electrode power supply terminal by using a discharge control switching element and a charge control switching element connected between the secondary battery and a load or a charger, the charge and discharge control circuit comprising:

a charger connection detector circuit that generates a charger connection detection signal, based on a voltage of an external positive electrode terminal connected to the charger; and a pull-down detector circuit that detects a pull-down of the voltage of the external positive electrode terminal, based on the voltage of the external positive electrode terminal, and generates a pull-down detection signal, wherein the charge and discharge control circuit is configured to turn off the discharge control switching element, and then, is controlled not to receive the charger connection detection signal until receiving the pull-down detection signal, and is configured to turn on the discharge control switching element after receiving the pull-down detection signal and receiving the charger connection detection signal.

9. A battery device comprising:

a charge and discharge control circuit configured to control charge and discharge of a secondary battery connected between a positive electrode power supply terminal and a negative electrode power supply terminal by using a discharge control switching element and a charge control switching element connected between the secondary battery and a load or a charger;

the secondary battery;

the discharge control switching element; and the charge control switching element, wherein the charge and discharge control circuit comprises:

a charger connection detector circuit that generates a charger connection detection signal, based on a voltage of an external positive electrode terminal connected to the charger; and a pull-down detector circuit that detects a pull-down of the voltage of the external positive electrode terminal, based on the voltage of the external positive electrode terminal, and generates a pull-down detection signal, wherein the charge and discharge control circuit is configured to turn off the discharge control switching element, and then, is controlled not to receive the charger connection detection signal until receiving the pull-down detection signal, and is configured to turn on the discharge control switching element after receiving the pull-down detection signal and receiving the charger connection detection signal.

10. A charge and discharge control method executed by a charge and discharge control circuit configured to control charge and discharge of a secondary battery connected between a positive electrode power supply terminal and a negative electrode power supply terminal by using a discharge control switching element and a charge control switching element connected between the secondary battery and a load or a charger, the charge and discharge control method comprising the steps of:

by a charger connection detector circuit, generating a charger connection detection signal, based on a voltage of an external positive electrode terminal connected to the charger;

by a pull-down detector circuit, detecting a pull-down of the voltage of the external positive electrode terminal, based on the voltage of the external positive electrode terminal, and generating a pull-down detection signal;

by the charge and discharge control circuit, turning off the discharge control switching element, and then, being controlled not to receive the charger connection detection signal until receiving the pull-down detection signal; and by the charge and discharge control circuit, turning on the discharge control switching element after receiving the pull-down detection signal and receiving the charger connection detection signal.

* * * * *